(12) United States Patent
Nakano et al.

(10) Patent No.: US 11,179,641 B2
(45) Date of Patent: Nov. 23, 2021

(54) GAME SYSTEM, METHOD OF PROVIDING A MATCH-UP GAME, AND METHOD OF EXECUTING THE MATCH-UP GAME

(71) Applicant: BANDAI NAMCO ENTERTAINMENT INC., Tokyo (JP)

(72) Inventors: Atsushi Nakano, Tokyo (JP); Sho Aita, Tokyo (JP); Yuki Mizuhori, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 27 days.

(21) Appl. No.: 16/575,541

(22) Filed: Sep. 19, 2019

(65) Prior Publication Data
US 2020/0086218 A1    Mar. 19, 2020

(30) Foreign Application Priority Data

Sep. 19, 2018   (JP) .............................. JP2018-174687

(51) Int. Cl.
| | | |
|---|---|---|
| *A63F 13/795* | (2014.01) | |
| *A63F 13/798* | (2014.01) | |
| *A63F 13/5372* | (2014.01) | |
| *A63F 13/5375* | (2014.01) | |
| *A63F 13/5378* | (2014.01) | |

(52) U.S. Cl.
CPC ........ *A63F 13/795* (2014.09); *A63F 13/5372* (2014.09); *A63F 13/798* (2014.09); *A63F 13/5375* (2014.09); *A63F 13/5378* (2014.09); *A63F 2300/556* (2013.01); *A63F 2300/558* (2013.01)

(58) Field of Classification Search
CPC .. A63F 13/795; A63F 13/5372; A63F 13/798; A63F 13/5375; A63F 13/5378; A63F 2300/556; A63F 2300/558
See application file for complete search history.

(56) References Cited

U.S. PATENT DOCUMENTS

2015/0080131 A1* 3/2015 Bacon .................. A63F 13/216
463/42

FOREIGN PATENT DOCUMENTS

JP    2004-113355 A    4/2004

* cited by examiner

*Primary Examiner* — Corbett B Coburn
(74) *Attorney, Agent, or Firm* — Oliff PLC

(57) ABSTRACT

The server performs the ranking determination process for determining the ranking of each player based on the variable information stored in a given timing, the specific player specifying process specifying a player who satisfies a given condition for the determined ranking of each player as a specific player, and the information providing process for providing the player-related information of the specific player stored in a player information storage and identification information for identifying the specified player from other players, to the terminal device concerned, in association with each other.

11 Claims, 11 Drawing Sheets

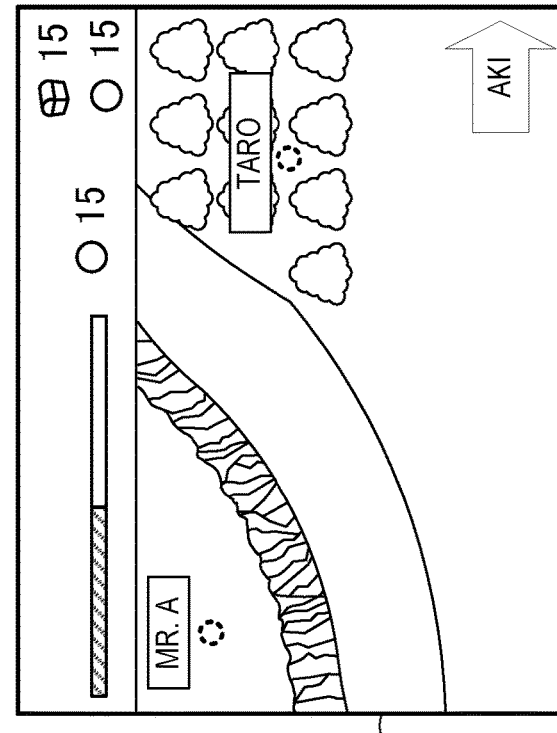
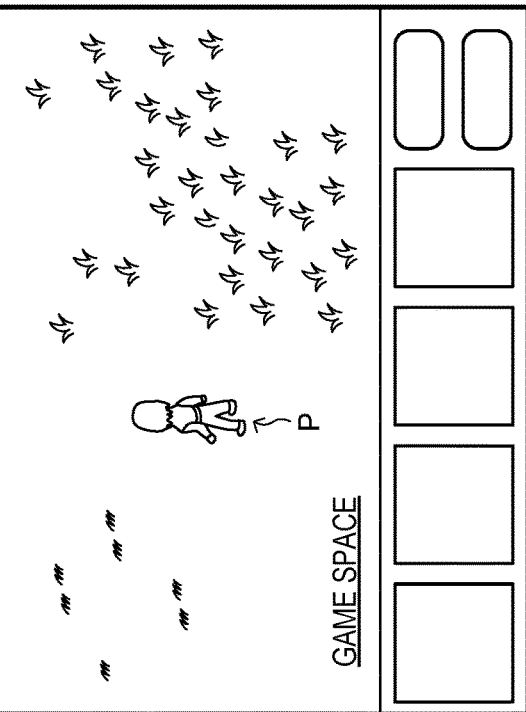
FIG. 4A — RANKING OF ALL PLAYERS
FIG. 4B — TOP 3 OF THE RANKING (SPECIFIC PLAYER)
FIG. 4C — GAME IMAGE

| ID | COORDINATE INFORMATION | VARIABLE INFORMATION | CHARACTER INFORMATION | STATUS INFORMATION | ACTION INFORMATION/ ACTION-HISTORY INFORMATION | TEAM INFORMATION | CHARGING INFORMATION |
|---|---|---|---|---|---|---|---|
| TARO 001 TEAM A | | | | | | | |
| ... | ... | ... | ... | ... | ... | ... | ... |

FIG. 5A

| ID | VARIABLE INFORMATION | | | | | TEAM MATCH RESULT INFORMATION |
|---|---|---|---|---|---|---|
| | MATCH RESULT INFORMATION | POINT INFORMATION | LEVEL INFORMATION | STATUS INFORMATION | ABILITY VALUE INFORMATION | |
| TARO/001/TEAM A | | | | | | |
| ... | ... | ... | ... | ... | ... | ... |

FIG. 5B

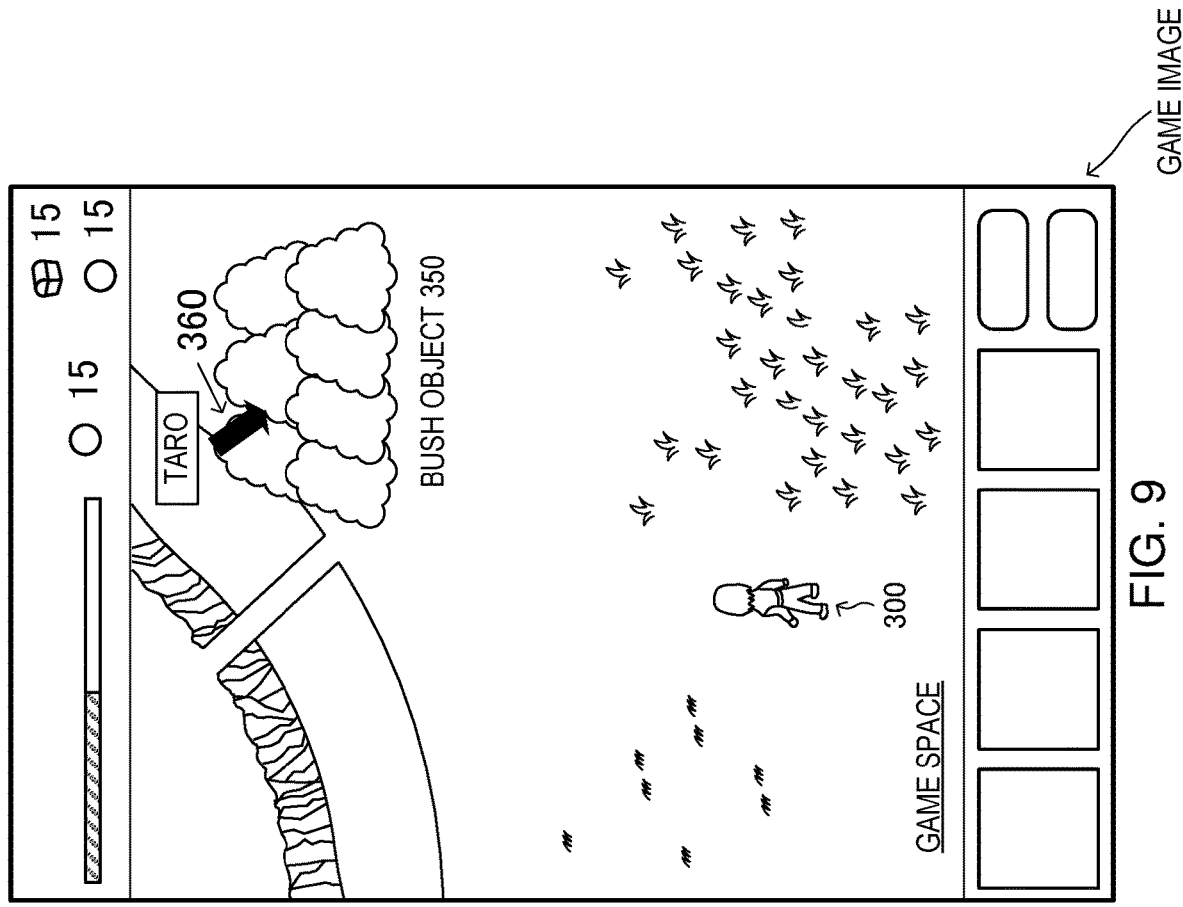

GAME SYSTEM, METHOD OF PROVIDING A MATCH-UP GAME, AND METHOD OF EXECUTING THE MATCH-UP GAME

Japanese Patent Application 2018-174687, filed Sep. 19, 2018, is hereby incorporated by reference in its entirety.

BACKGROUND OF THE INVENTION

The present invention relates to a method of providing a game system, a match-up game and a method of executing the match-up game, and the like.

Conventionally, action games and shooting games, such as TPS (Third-Person Shooting) games (Third Person Shooter) and FPS (First-Person Shooting) games (First Person Shooter) have game been known in the art. The Third-Person Shooter, in which the player character voluntarily moves in the game world or the game space and uses weapons or bare hands, is executed with a third person view for following the player character of the game. The First-Person Shooting, in which the player character voluntarily moves in the game world or the game space and uses weapons or bare hands, is executed through the eyes of the player character of the game.

In such games, a battle-royal type game, in which a plurality of players or teams participate in a game world and of which the winner player or team is the player or team who has been able to continue the game until the end, or a roll-playing game (MMORPG: a Massively Multiplayer Online Role-Playing Game) or the like are known.

In addition, in ranking to execute a heated game, there is a need for a game system in which a heated game can be executed by eliminating the difference in ability between the players, since always a competent player wins the game.

On the other hand, it is also known that in another match-up game in which a plurality of enemy characters compete, in ranking to execute the match-up game advantageously, the enemy character important for executing the game is identified from among the enemy characters, and information such as the location of the identified enemy character is displayed on images of the match-up game (for example, Japanese Unexamined Patent Application Laid-Open No. 2004-113355).

However, the game system described in Japanese Patent Application Laid-Open No. 2004-113355 merely provides information on the enemy character. Accordingly, even if such game system is applied to the match-up game as is, it is impossible to eliminate the ranking difference or the difference in the ability between the players. The such game system does not only execute the heated battle, but also there is no distinction between important information and unimportant information. Therefore, it is inevitable to simplify the construction of the strategy of the game, and as a result, it may reduce the entertainment of the game.

SUMMARY

The present invention can eliminate the ranking difference, in which the difference in performance is reflected, by providing the information regarding the ranking of the player, in ranking to achieve the heated game, and, then provide the information to the player for considering various strategies. Accordingly, the present invention can provide the game system or the like capable of improving the entertainment of the game in any player.

A game system according to a first aspect of the present invention, executes a match-up game in a plurality of player characters within a game field formed in a virtual space, provides information of the match-up game to a terminal device, and includes:

an information manager that manages player-related information relating to each player stored in a storage for each player during a game and variable information stored in the storage associated with each player and varied according to the progress of the game in the corresponding player;

a ranking determining processor that determines the ranking of each player based on the stored variable information at a given timing; a specifying processor that specifies a player that satisfies a given condition as a specific player based on the ranking of each player; and an information provider that provides the player-related information stored in association with the specified player, and identification information of identifying the specified player from other players, to the terminal device of the player concerned, in association with each other.

A method of providing a match-up game according to a second aspect of the present invention, executes a match-up game in a plurality of player characters within a game field formed in a virtual space, provides information of the match-up game to a terminal device, and includes:

managing player-related information relating to each player stored in a storage for each player during a game and variable information stored in the storage associated with each player and varied according to the progress of the game in the corresponding player;

a ranking determining step that determines the ranking of each player based on the stored variable information at a given timing;

a specifying step that specifies a player that satisfies a given condition as a specific player based on the ranking of each player; and an information providing step that provides the player-related information stored in association with the specified player and identification information of identifying the specified player from other players, to the terminal device concerned, in association with each other.

A game system according to a third aspect of the present invention, executes a match-up game in a plurality of player characters within a game field formed in a virtual space, and includes:

an information manager that manages player-related information relating to each player stored in a storage for each player during a game and variable information stored in the storage associated with each player and varied according to the progress of the game in the corresponding player;

a ranking determining processor that determines the ranking of each player based on the stored variable information at a given timing;

a specifying processor that specifies a player that satisfies a given condition as a specific player based on the ranking of each player; and a display controller that displays the player-related information stored in association with the specific player and identification information for identifying the specific player from other players, to a display concerned, in association with each other.

A method of executing a match-up game according to a fourth aspect of the present invention, executes a match-up game in a plurality of player characters within a game field formed in a virtual space, and includes:

managing player-related information relating to each player stored in a storage for each player during a game and variable information stored in the storage associated with each player and varied according to the progress of the game in the corresponding player;

a ranking determining step that determines the ranking of each player based on the stored variable information at a given timing;

a specifying step that specifies a player that satisfies a given condition as a specific player based on the ranking of each player; and a display control step that displays the player-related information stored in association with the specific player and identification information for identifying the specific player from other players, to a display concerned, in association with each other.

BRIEF DESCRIPTION OF THE SEVERAL VIEWS OF THE DRAWING

FIGS. 4A to 4C are diagrams for explaining an outline of an information providing process of the player-related information based on the ranking in the one embodiment.

FIGS. 5A and 5B are diagrams illustrating an example of the player-related information including the variable information stored in the player information storage of the one embodiment.

FIG. 9 is a diagram for explaining an information providing process (for the status information 3) performed by the server of the one embodiment.

Figure 1:
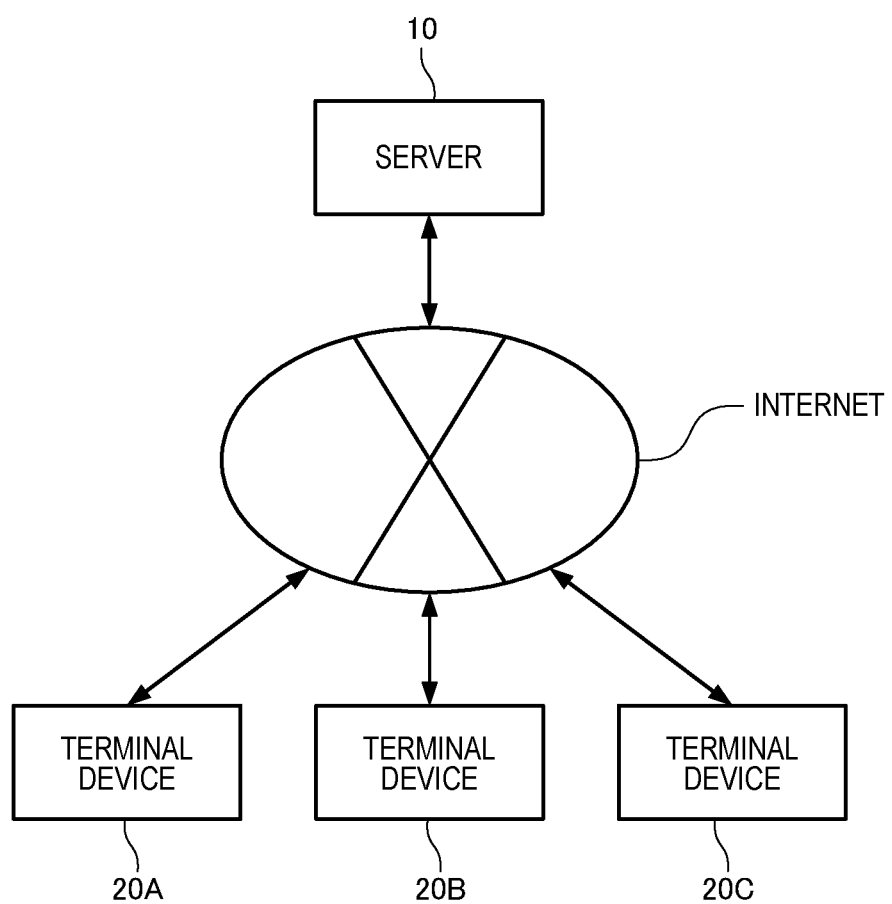
FIG. 1 is a diagram illustrating an example of a system configuration of the game system of the one embodiment.

DETAILED DESCRIPTION OF THE EMBODIMENTS (1) One embodiment according to the present invention relates to a game system for executing a match-up game in a plurality of player characters within a game field formed in a virtual space and providing information of the match-up game to a terminal device, the game system comprising:

an information manager that manages player-related information relating to each player stored in a storage for each player during a game and variable information stored in the storage associated with each player and varied according to the progress of the game in the corresponding player;

a ranking determining processor that determines the ranking of each player based on the stored variable information at a given timing;

a specifying processor that specifies a player that satisfies a given condition as a specific player based on the ranking of each player; and an information provider that provides the player-related information stored in association with the specified player, and identification information of identifying the specified player from other players, to the terminal device of the player concerned, in association with each other.

According to the game system described above, in the match-up game in which a plurality of players fight, important information for planning the strategy of the game in each player, such as information of equipment and capabilities, a location in a virtual space, and information for losing including remaining lives or energy, regarding a player who is the threat during the execution of the game or who has a low level which is highly likely to lose early, can be provided to other players.

For example, the game system can:

(A1) handicap a high-ability player in the game by providing the player-related information thereof;

(A2) inform a player, who is advantageous for playing against each player or who is to be protected from attack by another player, by providing the player-related information of a low-level player;

(A3) plan a team strategy by providing, to the high-ability player, such as a team leader or a player who has a predetermined level or more in the team, information of a player who is likely to lose or player-related information of another team leader or a player who has a predetermined level or more in the team, when fighting between the teams; or (A4) plan a strategy for fighting against to an opponent player(s) by providing player-related information of the player, who has a recovery item or requests to transfer a special capability, to a player who is likely to lose the game.

Accordingly, the method of providing the match-up game can support the player in planning various strategies in the match-up game, such as the strategy of the high-ability player, the low ability player strategy, or the team strategy. As a result, the method of providing the match-up game can realize the heated match-up game by eliminating the difference in performance and the ranking difference of the game, and therefore, can improve the entertainment of the game by any player.

In particular, it is preferable that the game system be applied to the match-up games (including action role playing games, etc.) such as FPS (first person shooter) and TPS (third person shooter) which fight by the multiple players with different capabilities. In addition, the game system can be applied to a match-up game executed by the plurality of players (including a computer).

For example, the "player-related information" includes:

(B1) information of the coordinates (location information) of the virtual space of the player character operated by the player, navigation information, orientation(s) of the player character(s) and an orientation of a virtual camera;

(B2) variable information;

(B3) information of the current position, characteristics, and attributes of the player character;

(B4) information of the equipment (items) and ability of the player character (including information of the type of the player character and the status of the item equipped with).

(B5) information (hereinafter referred to as "action information") of the current action of the player characters such as during equipment preparation, resting (including while sleeping and eating) fighting against another player character, and the like, as well as information of the action history of the player characters such as the location in the played game space, the equipment used during the game, and the moving area;

(B6) information of the same team of the player characters, such as the number and position of the player characters belonging to the same team; and (B7) information of the in-game money, the current billing amount and a billing history(s) of the player character(s). For example, "variable information" may also include, (C1) information for quantifying ability of a player to compare with another player such as information of the winning rate and the kill-death rate (the number of the killed players/(the number of the killed players+ the number of deaths of the own player)) in the game;

(C2) points (including items such as coins) and scores acquired in the match-up game (C3) the game level, (C4) the level and number of stages cleared by the player, (C5) the level of tasks achieved and the number of accomplished tasks, and (C6) information quantified in terms of the items and the capabilities owned by the player.

For example, a "given timing" includes, (D1) the timing desired by each player, (D2) the timing every predetermined period, (D3) the predetermined time (including real time and in-game time) such as midnight each day, (D4) the timing at which the map in the game space has been changed, (D5) the timing at which a predetermined event has occurred or ended, including the timing at which the individual match or the team match has ended, and (D6) the timing at which a change in player's ranking has occurred based on the predetermined variable information.

For example, "specifying a player that satisfies a given condition as a specific player" includes:

(E1) a player that has an absolute ranking in the determined ranking, such as a player in the top three rankings;

(E2) a player that has the higher ranking (e.g., the 10th or higher ranking) than a player that is provided with player-related information, or a predetermined or lower ranking (e.g., the 10th or lower ranking) than the player that provided the player-related information;

(E3) a player that has a predetermined condition according to a predetermined ranking difference between the top player and the player that is provided the player-related information (when the ranking difference is "5," the player is specified in the top three rankings, or when the ranking difference between the top player and the top player is "50" or more, only the top player is specified and the like); and (E4) a player that has the predetermined number of the characters who lost to the player, or a player that has the number of wins in the match-up game between individuals or teams.

The "identification information" includes the player ID, the player character ID, the player's login name, the player's nickname in the game, and the name of the player character.

In addition to the above, the "terminal device of the appropriate player" includes, for example:

(F1) a terminal device of a player requesting to display information of the player-related;

(F2) a terminal device of a player having a lower ranking (or higher ranking) than that of a player requesting to display player-related information (e.g., a terminal device of a player having a ranking difference of 10 or more); or (F3) a terminal device of a player having a predetermined level, predetermined item, or predetermined capability, and the like.

(2) In the above-described game system, the information provider provides, as the player-related information, coordinate information including at least coordinates of the specific player character which is operated by the specific player within a virtual space, to the terminal of the appropriate specific player, in association with the identification information of the specific player.

According to the game system described above, it is possible to provide important information to other player in order to plan the strategy of the game in each player. Accordingly, the game system can support the player in developing various strategies in a variety of match-up games, such as the strategy of the high-ability player, the low ability player strategy, or the team strategy.

For example, the "coordinate information" includes, in addition to the coordinate information of the specific player character:

(G1) information of the area that is formed by pre-dividing the virtual space into a plurality of areas, and that includes the coordinates of the specific player character;

(G2) information of the navigation indicating the route from the location in the virtual space of the player character to the coordinates of the specific player or the character, and the direction of the coordinates from the location in the virtual space of the player character; and (G3) the orientations of the player character and the direction of the virtual camera to image the virtual space.

In particular, the coordinate information may be information for displaying in a main game image for displaying in the virtual space in which the player characters move, or information for displaying in a sub game image in which a map of the virtual space or a radar for viewing in the virtual space is displayed, separate from the main game image for displaying in the virtual space.

(3) In the above-described game system, the information provider provides, as the player-related information, status information representing the status of the specific player character which is operated by the specific player, to the terminal of the appropriate specific player, in association with the identification information of the specific player.

According to the game system described above, it is possible to provide important information to other players in order to plan the strategy of the game in each player. Accordingly, the game system can support the player in developing various strategies in a variety of match-up games, such as the strategy of the high-ability player, the low ability player strategy, or the team strategy.

For example, "status information" includes:

(H1) information of equipment installed on a player character (including offensive equipment, attack protection equipment, attack and defense support equipment, and camouflage items to camouflage in the background), capability of equipment (including conditions for use of remaining ammunition, etc.), information whether or not the equipment was used when other player character is lost, level of equipment, skill of the player character regarding the equipment (handling skill), and expiration date of the equipment;

(H2) information regarding the capability of the player character (offensive power, defensive power, agility, types of capability such as magic and superiority);

(H3) information of the position of the player character (orientation and positions of parts of the player character's body) and the state of the player character (wet state, a state of food shortage and the like);

(H4) information of the condition for losing the player character, such as the power value of the player character; and (H5) information of the status, such as the level of the player and the player character, or the achievement rate of the task.

(4) In the above-described game system, the information provider provides, as the status information, information for displaying information indicating an invalidated status, to the terminal of the appropriate specific player, in association with the identification information of the specific player, when the specific player character is in a non-recognizable status or a camouflage status, the invalidated status invalidating the non-recognizable status or the camouflage status of the specific player character which is operated by the specified player, the non-recognizable status being a status in which other players are not able to recognize the specific player character, the camouflage status being a status in which the specific player character camouflages on a given object in the virtual space.

According to the game system described above, it is possible to provide important information to other players in order to plan the strategy of the game in each player. Accordingly, the game system can support the player to plan various strategies in a variety of match-up games, such as the strategy of the high-ability player, the low ability player strategy, or the team strategy.

For example, the "non-recognizable status" refers to a status where the player character is hidden from another player using an object formed in the virtual space, such as hiding behind the object of a building.

For example, "camouflage status" refers to a status in which the appearance and the shape of the s specific player character are formed by the same color (including the same type of color) or the same colored design with each object of a construction, such as grass uneven, mountainous area, forest area, urban area, sea, river, lake, construction including a building, or the like, or a moving body, such as a car or a train, so that the specific player character is integrated into the surrounding landscape.

Further, "displaying information indicating an invalidated status" indicates, for example:

(I1) displaying an object between a specific player character that is hidden and a player character of a target player for providing player-related information as a transparent object, or visualizing a specific player character in a non-recognizable status or a camouflage status that is not recognizable by another player, such as highlighting the appearance or the shape on the specific player character in the camouflage status; and (I2) displaying the location of the specific player character on the terminal device by arrows or text on the specific player character in the non-recognizable or camouflage status.

(5) In the above-described game system, the information provider provides, as the player-related information, action information of the specific player character which is operated by the specific player, to the terminal of the appropriate specific player, in association with the identification information of the specific player.

According to the game system described above, important information for planning the strategy of the game in each player can be provided to other players, such as the specific player character is in a resting status or the equipment is being checked (i.e., in a status of preparation). Accordingly, the game system can support the player in developing various strategies in a variety of match-up games, such as the strategy of the high-ability player, the low ability player strategy, or the team strategy.

For example, "action information" includes:

(J1) information indicating that the equipment used for attacks, such as the reloading of firearms, is being prepared;

(J2) information indicating the period until the preparations of the above equipment are completed; and (J3) information indicating that it is impossible to avoid the attacks from other players, such as while resting (including while eating or sleeping), climbing walls, or fighting.

(6) In the above-described game system, the information provider provides, as the player-related information, action history-related information indicating action history of the specific player character which is operated by the specific player during the game, to the terminal of the appropriate specific player, in association with the identification information of the specific player.

According to the game system described above, it is possible to provide important information to other players in order to plan the strategy of the game in each player. Accordingly, the game system can support the player in developing various strategies in a variety of match-up games, such as the strategy of the high-ability player, the low ability player strategy, or the team strategy.

For example, the "action history-related information" includes:

(K1) a location or an area in a virtual space in which the specific player character appears more than a predetermined number of times;

(K2) information relating to the match, such as the moving route, the type and number of attacks that the specific player character executed, or the type and number of attacks that the specific player character received from other player characters, during the predetermined period before the given timing or the last predetermined number of the matches in the past;

(K3) information relating to a reason for winning or losing the specific player character during the predetermined period before the given timing or in the last predetermined number of the matches in the past;

(K4) information relating to a strategy for the specific player character to win based on the action history of the specific player character, such as the specific player character has to set the long preparation period during the match-up game in order to have equipment that has a long set period of preparation; and (K5) action prediction information of the player character corresponding to the action history and the current status.

(7) In the above-described game system, the information provider changes a content of the player-related information which is provided to the terminal device of the appropriate specific player, according to the ranking of the specific player.

According to the game system, for example, the higher the ranking (or the lower the ranking), the more detailed the coordinate value as the player-related information, or more information of the specific player character. Accordingly, the game system can easily (easily support) attack (or increase the probability of winning) the player character of a high-ranking (or low-ranking) player and then, increase the winning rate of the match-up game.

As a result, since the game system can provide the more heated match-up game, it is possible to improve the entertainment of the game to various players, including making the game entertain even when there is a difference in player ability.

For example, "changing the content of the player-related information" refers to change the accuracy of the displayed player-related information, and the amount and the detail of the displayed player-related information.

For example, the changing the accuracy of the displayed player-related information indicates that the accuracy of the location in the virtual space can be changed by adjusting the error (higher accuracy of the location of the higher-ranking specific player). The changing the level of detail of the displayed player-related information indicates that the level of the equipment type category (large category (attack item or defensive item), middle category (gun or sword in attack item), and small category (machine gun or pistol in gun item)) can be changed. The changing the amount of the displayed player-related information indicates that the amount of information of the offensive power of the equipment (only information of the number of ammunitions that can be loaded, this information and information of accuracy rate when using the offensive equipment, or the like).

(8) In the above-described game system,
the information provider changes a display frequency of the player-related information which is provided to the terminal device of the appropriate specific player according to the ranking of the specific player.

According to the game system described above, for example, the higher (or lower) ranking the player has, the shorter intervals the information can be displayed at, the higher the probability of determining whether or not the information is displayed can increase, and the longer the period for which the information can be displayed.

Accordingly, since the game system can provide the information of the specific player of the higher (or lower) to the other players, and make the specific player of the higher (or lower) disadvantageous more, it is possible to provide a more intense match-up game even when there is a difference in ability of the player.

For example, the term "changing the display frequency in accordance with the ranking of the specific players" indicates that:
(L1) the display interval of the player-related information of the higher (or lower) specific player is shorter when the player-related information of each player is displayed at regular intervals;
(L2) the player-related information of the higher (or lower) specific player is displayed with higher probability when displaying the location of the player character using weapons as player-related information, and when determining whether or not the location is displayed based on the probability; or
(L3) the player-related information of the higher (or lower) specific player is displayed longer when displaying the player-related information of each player in the display period which is set.

(9) In the above-described game system,
the information provider changes a display content of the player-related information of the specific player for displaying according to the ranking of the specific player and a distance in the virtual space from a player character operated by the appropriate player to the specific player character of the specific player.

According to the game system described above, for example, the higher ranking (or the lower ranking) the player has, the player-related information of the specific player, who operates the specific player character existing further from the player character which the target player operates, can be provided. Accordingly, the game system can easily attack (or easily support) the player character of the high-ranking (or low-ranking) player, and then, increase the winning rate of the match-up game.

As a result, since the game system can provide the more heated match-up game, it is possible to improve the entertainment of the game to various players, including making the game entertain even when there is a difference in player ability.

(10) In the above-described game system,
the specifying processor specifies a player which has a predetermined ranking determined based on the ranking of each player, as the specific player which satisfies the given condition.

According to the game system, the player having an absolute ranking can be decided, as the specific player, such as a top three ranking player. Accordingly, the present invention can provide the relevant player with information about a higher or lower player to be won.

Therefore, the game system can focus spotlight on the player-related information of the player who is to beat, and thus support the player to plan the strategy of the game.

Additionally, the content of the displayed player-related information may be varied according to the ranking difference from the specified player (accuracy or amount of the information).

For example, the player-related information of the top one specific player may be displayed with higher accuracy than the specific player of the top five ranking, and displayed more. On the contrary, the player-related information of the specific player of the top five ranking may be displayed with higher accuracy than the top one specific player, and displayed more.

(11) In the above-described game system,
the specifying processor specifies a player which has a predetermined ranking determined based on the ranking of the player which has the terminal provided with player-related information, as the specific player which satisfies the given condition.

According to the game system described above, for example,
(L1) a player having a higher ranking of the predetermined ranking (for example, a higher ranking of 10th or more) or a lower r ranking of the predetermined ranking (for example, a lower ranking of 10th or more) from a player of the terminal device in which player-related information is displayed, or
(L2) a player having a predetermined condition according to the ranking difference between the player of the terminal device in which player-related information is displayed and the top player (when the ranking difference between the top ranking and the player of the terminal device is "5," the player in the top ranking to the third ranking, when the ranking difference is "50 or more, only the player in the top one ranking), can be specified as a specific player.

Accordingly, the game system can focus spotlight on the player-related information of the player who is to beat, and thus support the player to plan the strategy of the game.

Additionally, the accuracy of the displayed player-related information may be changed according to the ranking difference from the specified player.

For example, the player-related information of a specific player having a higher relative ranking displayed in the terminal device may be displayed more accurately, or with more information than the player-related information of a specific player having a lower relative ranking. On the contrary, the player-related information of a specific player having a lower relative ranking may be displayed more accurately or with more information than the player-related information of a specific player having a higher relative ranking.

(12) One embodiment according to the present invention relates to a method of executing a match-up game in a plurality of player characters within a game field formed in a virtual space and providing information of the match-up game to a terminal device, the method including:

managing player-related information relating to each player stored in a storage for each player during a game and variable information stored in the storage associated with each player and varied according to the progress of the game in the corresponding player;

a ranking determining step that determines the ranking of each player based on the stored variable information at a given timing;

a specifying step that specifies a player that satisfies a given condition as a specific player based on the ranking of each player; and an information providing step that provides the player-related information stored in association with the specified player and identification information of identifying the specified player from other players, to the terminal device concerned, in association with each other.

According to the game system described above, in the match-up game in which a plurality of players fight, important information for planning the strategy of the game in each player, such as information of equipment and capabilities, a location in a virtual space, and information for losing including life or energy, regarding a player who is the threat during the execution of the game or who has a low level which is highly likely to lose early, can be provided to other players.

Accordingly, the method of providing the match-up game can support the player in planning various strategies in the match-up game, such as the strategy of the high-ability player, the low ability player strategy, or the team strategy. As a result, the method of providing the match-up game can realize the heated match-up game by eliminating the difference in performance and the ranking difference of the game, and therefore, can improve the entertainment of the game by any player.

(13) One embodiment according to the present invention relates to the game system for executing a match-up game in a plurality of player characters within a game field formed in a virtual space, the game system including:

an information manager that manages player-related information relating to each player stored in a storage for each player during a game and variable information stored in the storage associated with each player and varied according to the progress of the game in the corresponding player;

a ranking determining processor that determines the ranking of each player based on the stored variable information at a given timing;

a specifying processor that specifies a player that satisfies a given condition as a specific player based on the ranking of each player; and a display controller that displays the player-related information stored in association with the specific player and identification information for identifying the specific player from other players, to a display concerned, in association with each other.

According to the game system described above, in the match-up game in which a plurality of players fight, important information for planning the strategy of the game in each player, such as information of equipment and capabilities, a location in a virtual space, and information for losing including life or energy, regarding a player who is the threat during the execution of the game or who has a low level which is highly likely to lose early, can be provided to other players.

Accordingly, the method of providing the match-up game can support the player in planning various strategies in the match-up game, such as the strategy of the high-ability player, the low ability player strategy, or the team strategy. As a result, the method of providing the match-up game can realize the heated match-up game by eliminating the difference in performance and the ranking difference of the game, and therefore, can improve the entertainment of the game by any player.

(14) One embodiment according to the present invention relates to a method of executing a match-up game in a plurality of player characters within a game field formed in a virtual space, the method including:

managing player-related information relating to each player stored in a storage for each player during a game and variable information stored in the storage associated with each player and varied according to the progress of the game in the corresponding player;

a ranking determining step that determines the ranking of each player based on the stored variable information at a given timing;

a specifying step that specifies a player that satisfies a given condition as a specific player based on the ranking of each player; and a display control step that displays the player-related information stored in association with the specific player and identification information for identifying the specific player from other players, to a display concerned, in association with each other.

According to the game system described above, in the match-up game in which a plurality of players fight, important information for planning the strategy of the game in each player, such as information of equipment and capabilities, a location in a virtual space, and information for losing including life or energy, regarding a player who is the threat during the execution of the game or who has a low level which is highly likely to lose early, can be provided to other players.

Accordingly, the method of providing the match-up game can support the player in planning various strategies in the match-up game, such as the strategy of the high-ability player, the low ability player strategy, or the team strategy. As a result, the method of providing the match-up game can realize the heated game by eliminating the difference in performance and the ranking difference of the game, and therefore, can improve the entertainment of the game by any player.

Hereinafter, embodiments of the present invention will be described. The embodiments described below are not intended to unduly limit the contents of the invention described in the claims. Moreover, not all of the configurations described in the following embodiments are essential components of the present invention.

1. Game System

First, an outline and an outline configuration of the game system 1 according to an embodiment of the present invention will be described with reference to FIG. 1. FIG. 1 is a diagram showing an example of a system configuration showing of the game system 1.

As shown in FIG. 1, the game system 1 is configured so that the server 10 providing the game service and the terminal device 20 (for example, the terminal devices 20A, 20B, and 20C) can connect to the Internet (an example of a network).

The user can play the game transmitted from the server 10 via the Internet by accessing the server 10 from the terminal device 20. Further, the user can communicate with other users by accessing the server 10 from the terminal device 20.

The server 10 is an information processing device capable of providing the service of allowing a user to play a game using a terminal device 20 communicatively connected via the Internet. The server 10 may function as an SNS server that provides a communication-based service. Additionally, the SNS server may be an information processing device that provides a service that can provide communication between a plurality of users.

For example, when the server 10 functions as the SNS server, the server 10 can provide a game called a social game (social game) executed using the hardware environment (API (application programming interface), platform, or the like) of the SNS provided.

In particular, the server 10 can provide a browser game, (a game that starts by simply connecting an Web site in a web browser) produced in various languages, such as HTML, FLASH, CGI, PHP, shockwave, Java(™) applet, and JavaScript(™), on the web browser of the terminal device 20.

Additionally, different from an existing online game, the social game includes a game that does not require dedicated client software and that can be used only for Web browsers and SNS accounts. The server 10 has a configuration that allows the server 10 to connect to another user's terminal (smartphones, personal computers, game machines, or the like) via a network and provide an online game in which the same game progress can be shared simultaneously on-line.

On the other hand, the server 10 may have one (device, processor) or a plurality of (device, processor).

Further, information, such as billing information and the game information, stored in the storage area (storage section 140 to be described later) of the server 10 may be stored in a database (storage devices and memory in the broad sense) connected to the network (intranet or the Internet). In the case of functioning as an SNS server, information, such as the player information storage section 146 stored in the storage area, may be stored in a database (storage devices and memory in the broad sense) connected to the network (intranet or the Internet).

Specifically, the server 10 receives input information based on an operation of a user of the terminal device 20 (i.e., a player who executes a game) and performs game processing based on the received input information. The server 10 transmits the game processing result to the terminal device 20, and the terminal device 20 performs various processing that provides the game processing result received from the server 10 to the terminal device 20 for viewing.

The terminal device 20 is an information processing device such as a smartphone, a cellular phone, a PHS, a computer, a game device, a PDA, a portable game device, or the like, and can be connected to the server 10 via an image generating device a network such as the Internet (WAN) or a LAN. The communication lines between the terminal device 20 and the server 10 may be wired or wireless.

The terminal device 20 includes a web browser capable of viewing web pages (data in HTML format). In other word, the terminal device 20 has: a communication control function for communicating with the server 10; and a web browser function for a web browser function for controlling display using data received from the server 10 (web data, data created in HTML format, or the like) and transmitting data of user operation to the server 10, and various processing for providing the game image to the user is executed so that the user executes the game. In this regard, the terminal device 20 may acquire the game control information provided from the server 10, execute a predetermined game processing, and execute a game based on the game processing.

Specifically, when the terminal device 20 requests the server 10 to perform a predetermined game, it is connected to the game site of the server 10 and the game is started. In particular, the terminal device 20 has a configuration to executes the game by making server 10 perform predetermined processing as an SNS server, using the API as necessary. The terminal device 20 has a configuration to executes the game by receiving the player information managed by the server 10 that functions as an SNS server.

2. Server

Figure 2:
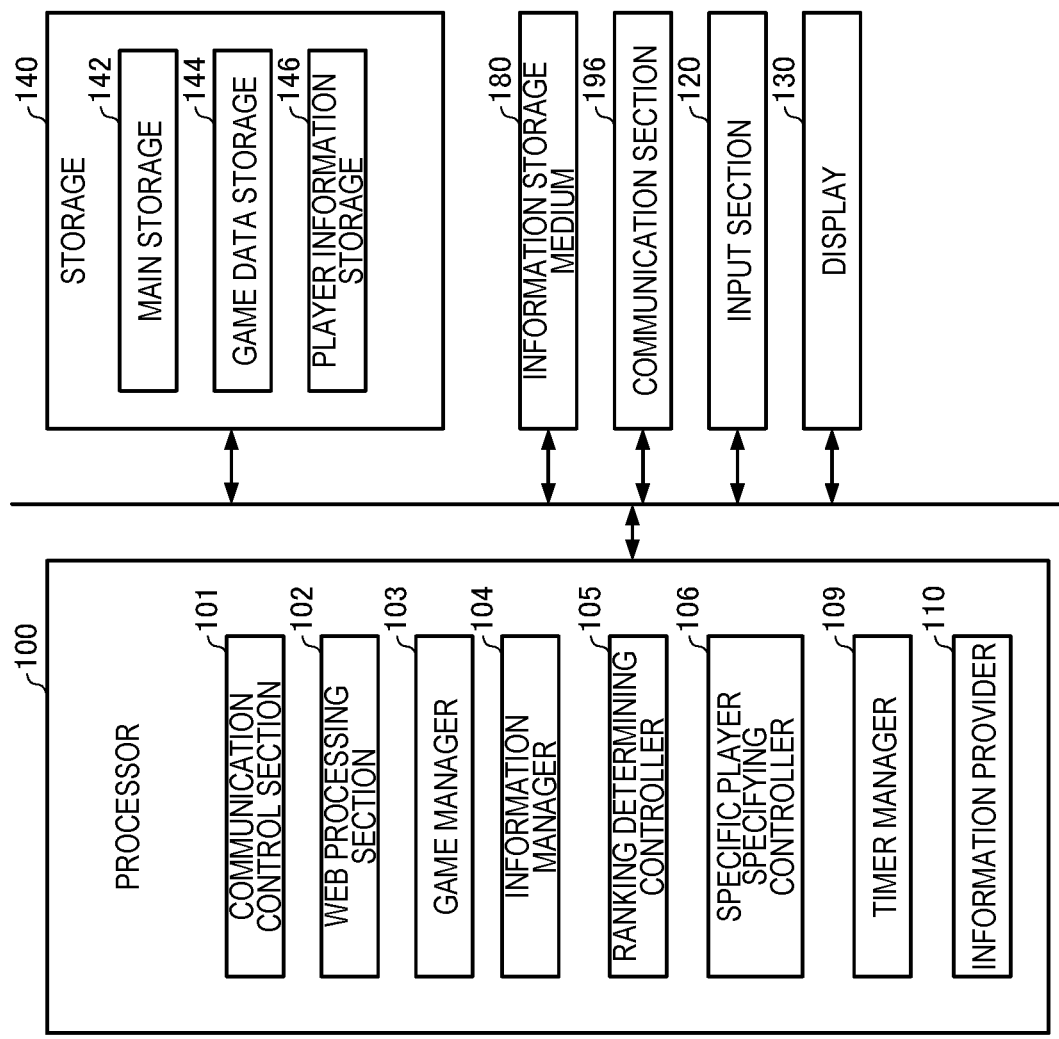
FIG. 2 is a diagram illustrating a functional block of a server in the one embodiment.

Next, the server 10 will be described with reference to FIG. 2. FIG. 2 is a diagram illustrating a functional block of the server 10. In addition, the server 10 may have a configuration in which a portion of the component (each portion) shown in FIG. 2 is omitted.

The server 10 includes: input unit 120 for use of an administrator or other input; a display 130 for displaying predetermined information, information storage medium 180 for storing predetermined information; communication unit 196 for communicating with the terminal device 20 or the other; processor 100 for mainly executing processing relating to the provided game; and a storage 140 for storing various data mainly used in a game.

The input unit 120 is used by the system administrator or the like for setting related to the game, other necessary setting, and data input. For example, the input portion 120 is a mouse, a keyboard, or the like.

The display 130 displays an operation screen for the system administrator. For example, the display 130 is a liquid crystal display or the like.

The information storage medium 180 (a computer-readable medium) stores programs, data, and the like. The information storage medium 180 includes an optical disc (CD, DVD), a magneto-optical disc (MO), a magnetic disc, a hard disc, a magnetic tape, or a memory (ROM).

The communication unit 196 performs various controls for communicating with an external device (for example, a terminal, another server, or other network system). The functions of the communication unit 196 has hardware, such as various processors or communication ASIC, and programs.

The storage 140 has a work area such as the processor 100 or the communication unit 196. The function of the storage 140 is configured by a RAM (VRAM) or the like. The information stored in the storage 140 may be managed in a database. The storage 140 serves as the storage according to this embodiment.

In addition to the main storage 142, the storage 140 has: game data storage 144 for storing game information indicating information relating the game; player information storage 146 for storing player information indicating information relating each of the players and information indicate and information relating player's game (hereinafter referred to as "player-related information"); and variable information storage 148 for storing variable information fluctuating during the game to determine the ranking of the game in each player.

In particular, the game data storage 144 stores information in the game field in which the game is executed, condition information used for various judgments, information of each object in the game field, information for changing each object, various table information, and information regarding the player character of each player, etc.

The player information storage 146 stores player-related information, such as location information corresponding to the player's nick name, player ID, and the team name or the team ID (hereinafter, the "affiliation information") when the player belongs to the team.

The variable information storage 148 stores the variable information of which each player participating in the game and which fluctuates in real time during the game.

The processor 100 performs various processes using the main storage 142 in the storage 140 as the work area. The function of the processor 100 can be realized by hardware or programs such as various processors (CPU, DSP, etc.) and ASICs (gate array, etc.).

The processor 100 performs various processing of the present embodiment based on the program (data) stored in the information storage medium 180. In other word, the information storage medium 180 stores a program (a program for causing the computer to perform the processing of each part) for having the computer function as each part of the present embodiment.

For example, the processor 100 performs control of the entire server 10 based on the program stored in the information storage medium and performs various processing such as control of data transfer between the parts. Further, processor 100 performs providing various services according to a request from the terminal device 20.

Specifically, the processor 100 includes at least communication controller 101, web processor 102, game manager 103, information manager 104, ranking determining controller 105, specific player specifying controller 106, timer manager 109, and information provider 110.

For example, the information manager 104 serves as the information manager according to the present embodiment, and the ranking determining controller 105 serves as the ranking determining controller according to the present embodiment. For example, the specific player specifying controller 106 serves as the specifying processor according to the present embodiment, and the information provider 110 serves as the information provider according to the present embodiment.

The communication controller 101 performs processing for transmitting and receiving data through the terminal device 20 and the network. In other word, the server 10 performs various processing based on the information received from the terminal device 20 by the communication controller 101. In particular, the communication controller 101 performs processing for transmitting the game image to the terminal device 20 of the player based on a request from the terminal device 20 of the player.

The Web processor 102 serves as a Web server. For example, the web processor 102 performs processing for transmitting data in response to a request from the web browser 211 installed in the terminal device 20 through a communication protocol such as HTTP (Hypertext Transfer Protocol), and processing for receiving data transmitted by the web browser 211 of the terminal device 20.

The server 10 also serves as an SNS server. However, the server 10 may be separately formed with the server for the game and the server for the SNS. The game processing according to the present embodiment may be performed in whole or in part by the server 10 or in part by the terminal device 20.

The game manager 103, by working with the terminal device 20, sets a game space as a virtual space and executes various game processing related to an action game, a shooting game, a roll-playing game (RPG), and a match-up game in each player based on the instructions of the player input through the terminal device 20.

The information manager 104 manages, for each player and during a game, player-related information stored in the player information storage 146, and variable information stored corresponding to each player.

The ranking determining processor 105 determines the ranking of each player based on the variable information stored in the storage 140 at a given timing.

The specific player specifying processor 106 specifies a player having a given condition as the specific player, such as a player having a predetermined ranking difference or a player having a high ranking up to the third ranking, with regard to the determined ranking of each player.

The timer manager 109 has a timer function and is used to manage the progress of the game. In particular, the timer manager 109 outputs the current time and a preset time to each unit, by working with the game manager 103. The timer manager 109 is used to synchronize with each terminal device.

The information provider 110 generates various game information for causing the game to be processed by the terminal device 20 and provides the game information to the corresponding terminal device 20.

Specifically, the information provider 110 generates information (i.e., game information) for controlling the target player characters of each player by the appropriate terminal device 20 and provides the generated game information to the appropriate terminal device 20.

In particular, the information provider 110 performs control for displaying the player-related information stored in association with the specified player and the identification information for identifying the specified player from other players in association with the terminal device 20 of the appropriate player.

For example, the information provider 110 generates player-related information and identification information of a specific player and display data to be displayed on the game image of the player's terminal device 20 and transmits the generated display data to the corresponding terminal device 20.

3. Terminal Device

Figure 3:
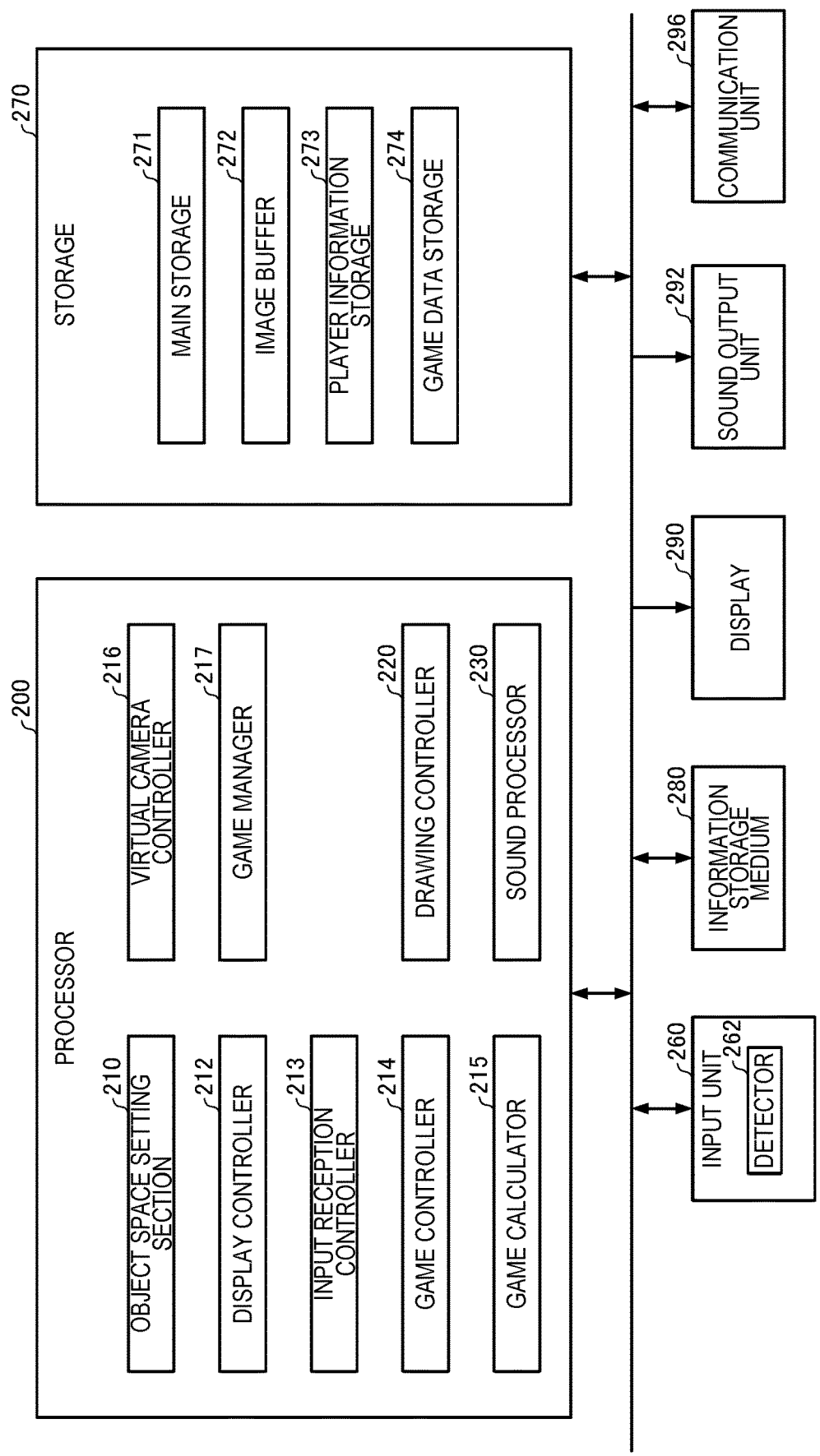
FIG. 3 is a diagram illustrating a functional block of a terminal device of the one embodiment.

Next, the terminal device 20 will be described with reference to FIG. 3. FIG. 3 is an example of a functional block diagram showing a configuration of a terminal device according to the present embodiment. In addition, the terminal device 20 may have a configuration in which a portion of the components (each portion) of FIG. 3 is omitted.

The input section 260 is used by a player for inputting operation data, and the function thereof can be implemented by a touch panel, a touch panel display or the like. In other word, the input unit 260 includes a detector 262 capable of detecting the two-dimensional reference location coordinates (x, y) on the screen on which the image is displayed. For example, the input section 260 includes a detector 262 capable of detecting the two-dimensional contact location coordinates (x, y) in the contact detection area (touch panel).

The touch operation on the display screen (hereinafter referred to as "touch panel" except in special cases) 12 may be performed by using a finger or an input device such as a touch pen.

The input unit 260 may include a button, a lever, a keyboard, a steering system, a microphone, an acceleration sensor, or the like capable of inputting operation information (an operation signal) other than the indicated position.

The storage 270 serves as a work area of the processor 200 and the communication unit 296. The function of the storage 270 can be realized by a RAM (VRAM) or the like. The storage 270 includes: a main storage 271 used as a work area; an image buffer 272 for storing the final display image or the like; user information 273 for indicating information about the user as a player of the provided game; and game data storage 274 for storing various data necessary for executing the game such as table data. The portion thereof may be omitted, and the storage 140 of the server 10 may be included.

The information storage medium 280 (a computer-readable medium) stores programs, data, and the like, and the functions thereof can be implemented by an optical disc (CD, DVD), a magneto-optical disc (MO), a magnetic disc, a hard disc, a magnetic tape, or a memory (ROM).

In addition, the information storage medium 280 can store a program (a program for causing a computer to execute the processing of each part) for having the computer function as each part of the present embodiment. As will be described later, the processor 200 performs various processing of this embodiment based on the program (data) stored in the information storage medium 280.

The display 290 outputs an image generated according to the present embodiment, and the function thereof can be realized by a CRT, an LCD, a touch panel type display, or an HMD (head-mounted display).

In particular, the display 290 also functions as an input unit 260 where the player performs the game operations by using the touch panel display. For example, the touch panel can be a resistive film type (4-wire, 5-wire), a capacitance sensing type, an electromagnetic induction type, an ultrasonic surface acoustic wave type, an infrared scanning type, or the like.

The sound output unit 292 outputs a sound generated by the present embodiment, and the function thereof can be realized by a speaker, a headphone, or the like.

The communication unit 296 performs various controls for communicating with an external device (for example, a host device or other terminal device). The functions of the communication unit 296 can be implemented in hardware, such as various processors or communication ASICs, or in programs.

The terminal device 20 may receive through the network the program or the data for causing a computer to function as parts of the present embodiment, and store the received program or data in the information storage medium 280 or the storage 270. Such a program or data may be included within the scope of the present invention to cause the terminal device 20 to function.

The processor 200 (processor) performs processing such as game processing, image generation processing, or sound generation processing in cooperation with the server 10 on the basis of input data from the input unit 260 or programs.

In particular, the game processing includes processing for starting the game when the game start condition is satisfied, processing for proceeding with the game, processing for arranging objects such as player characters and other player characters, processing for displaying objects, processing for calculating the game result, or processing for terminating the game when the game end condition is satisfied.

The processor 200 performs various processes using the storage 270 as the work area. The function of the processor 200 can be realized by hardware or programs such as various processors (CPU, DSP, etc.) and ASICs (gate array, etc.).

In particular, the processor 200 includes object space setting unit 210, display controller 212, input reception controller 213, game controller 214, game calculator 215, virtual camera controller 216, game manager 217, drawing controller 220, and sound processor 230. In addition, it may be configured to omit a part of the above.

The object space setting section 210 performs a process of setting various objects representing objects (player characters, movable objects, and other player characters), moving paths, constructions, trees, pillars, walls, maps (geography), and other display objects (objects composed of primitive planes such as sprites, billboards, polygons, free-form surfaces, or subdivision surfaces) in an object space.

Specifically, the object space setting section 210 determines the location and rotation angle (synonym of orientation and direction) of the object (model object) and arranges the object at the location (X, Y) or (X, Y, Z) with the rotation angle (rotation angle around the X, Y, and Y axes) or (rotation angle around the X, Y, and Z axes).

Additionally, object space includes both so-called virtual two-dimensional space and virtual three-dimensional space. For example, the two-dimensional space is a space in which objects are arranged in two-dimensional coordinates (X, Y), and three-dimensional space is a space in which objects are arranged in three-dimensional coordinates (X, Y, Z).

When the object space is defined as a two-dimensional space, an object is arranged based on the priority set for each of a plurality of objects. For example, the object can be arranged in order starting from the object (sprites) that is shown to be in the far side, and the object that is shown to be in the front side can be arranged in an overlapping manner.

When an object with a large drawing size is disposed below the image and an object with a small drawing size is disposed above the image, the object space corresponding to the upper part of the screen appears to be located behind the image, and the object space corresponding to the lower part of the screen appears to be located at the front side.

When the object space is 3-D, an object is placed in the world coordinate system.

The display controller 212 displays the information necessary for preventing recurrence of the non-movable status in the game field to the display 290 based on the information transmitted from the server 10.

The input reception processing unit 213 receives the input instruction of the player input by the input unit 260 and outputs the received input instruction to the game controller 214, the server 10, or both.

The game controller 214 performs the game processing based on the command received by the input reception processor 213 in cooperation with the server 10.

In particular, the game controller 214 controls the character (i.e., the player character) to be operated, or controls the player character of another player and other accompanying characters, based on various information (game information, information of movement of the player character (including information of movement determination), information of movement status, information of rescue processing to be rescued from the movement impossibility status, or information of recurrence prevention when a movement impossibility status occurs) pertaining to the game transmitted from the server 10, and a command (i.e., an input instruction) received by the input reception processor 213.

For example, in the case of a match-up game or shooting game including an action game, the game controller 214 performs predetermined tasks such as supporting an attack on an enemy character or restoring the ability to react to an friend character, or in the case of a simulation game, creating a crop or constructing a building.

Meanwhile, the game controller 214 performs a movement operation of a character object of an operation target such as a mobile object (in particular, a character object such as a player character or another player character) in the object space.

In other word, the game controller 214 moves the mobile object in the object space or performs processing for controlling the operation (motion and animation) of the mobile object based on the game information transmitted from the server 10 and the input data or programs (movement algorithms) or various data (motion data) inputted by the player by the input unit 260 in conjunction with the server 10.

Specifically, the game controller 214 performs a simulation process for sequentially obtaining movement information (movement direction, movement amount, movement speed, location, rotation angle, or acceleration) or operation information (location or rotation angle of each part object) of an object for each frame. Additionally, a frame is the unit of time during which an object moves, operates (simulation) or creates an image. In this embodiment, the frame rate may be fixed or variable depending on the processing load.

The game controller 214 performs processing for moving the object in the three-dimensional object space based on the input direction. For example, the game controller 214 previously associates the movement direction with each input direction and moves the object in the movement direction corresponding to the input direction.

The game controller 214 may be executed in conjunction with the server 10, and a part or all of the game of the controller 214 may be formed in the server 10.

The game processor 215 performs various game operations. In particular, the game computing unit 215 performs the necessary computing processing, for executing a game such as forming a predetermined object space of a shooting game, forming an object space based on a map, progressing a game based on a scenario predetermined in accordance with an operation by a user, competing against a player character or other player character or other object, and managing parameters at the time of competition.

Although the game calculator 215 executes in conjunction with the server 10, a part or all of the game calculator 215 may be formed in the server 10.

The virtual camera controller 216 produces an image of the game space that appears to have a depth from a given viewpoint. In this case, the virtual camera controller 216 performs control processing of the virtual camera (viewpoint) for generating an image visible from a given (arbitrary) viewpoint in the object space. Specifically, the process (the process of controlling the viewpoint location and the direction of the viewing line) is performed for controlling the location of the virtual camera (X, Y, and Z) or the rotation angle (rotation angle around the X, Y, and Z axes)

For example, when an object (e.g., character, ball, or car) is shot from the rear by a virtual camera, the location or rotation angle (direction of the virtual camera) of the virtual camera is controlled so that the virtual camera follows the change in the location or rotation of the object.

In this case, the virtual camera can be controlled based on information such as the location, rotation angle, or speed of the object obtained in the game controller 214. Alternatively, the control may be exercised to rotate the virtual camera at a predetermined rotation angle or to move the virtual camera in a predetermined movement path. In this case, the virtual camera is controlled based on the virtual camera data for specifying the location (movement path) or rotation angle of the virtual camera.

The virtual camera may be set as the viewpoint of the player character. When multiple virtual cameras (viewpoints) exist, the control process described above is performed for each virtual camera.

The game manager 217 is associated with the server 10 and sets the player characters and various items used in the game such as the match-up game in each player based on the operation of the player input through the input unit 260 and the registers them in the user information 273.

The drawing controller 220 performs drawing processing based on various information concerning image generation transmitted from the server 10 and the results of various processing (game processing) performed by the processor 200, thereby generating an image and outputting the image to the display (display) 290.

In particular, the image generated by the drawing controller 220 may be a so-called two-dimensional image or a so-called three-dimensional image. Further, the drawing controller 220 produces an image visible from a virtual camera in an object space that is displayed on the screen.

Additionally, when a two-dimensional image is generated, the drawing controller 220 draws objects in order starting from a set object with a low priority, and when objects overlap each other, the drawing controller 220 draws objects with a high priority.

When a three-dimensional image is generated, the drawing controller 220 first receives object data (model data) including vertex data (location coordinates of the vertices, texture coordinates, color data, normal vector, or a value) of each vertices of the object (model), and performs the v vertex processing based on the vertex data included in the received object data. The drawing section 220 may optionally perform a vertex generation process (tessellation, curved surface division, or polygon division) for subdividing the polygon when performing the vertex process.

When the drawing section 220 performs the vertex process, the drawing section 220 performs a vertex movement process and a geometric process (e.g., coordinate transformation (world coordinate transformation or camera coordinate transformation), clipping, perspective transformation, or light source process), and changes (updates or adjusts) the vertex data that represents each vertex that forms the object based on the processing results. The drawing section 220 performs a rasterization process (scan conversion process) based on the vertex data subjected to the vertex process to link the surface of the polygon (primitive) to pixels. The drawing section 220 then performs a pixel process (fragment process) for drawing the pixels that form the image (fragments that form the display screen).

When the drawing section 220 performs the pixel process, the drawing section 220 determines the final drawing color of each pixel by performing a texture reading (texture mapping) process, a color data setting/change process, a translucent blending process, an anti-aliasing process, and the like, and outputs (draws) the drawing color of the object subjected to perspective transformation to the image buffer 272 (i.e., a frame buffer or a buffer that can store image information on a pixel basis (VRAM or rendering target)). Specifically, the pixel process includes a per-pixel process for setting or changing the image information (e.g., color, normal, luminance, and alpha-value) on a pixel basis.

The drawing section 220 thus generates an image that is viewed from the virtual camera (given viewpoint) set within the object space. When a plurality of virtual cameras (viewpoints) are provided, the drawing section 220 may generate an image so that images (segmented images) viewed from the respective virtual cameras are displayed within one screen.

The vertex process and the pixel process performed by the drawing section 220 may be implemented by hardware that enables a programmable polygon (primitive) drawing process (i.e., programmable shader (vertex shader or pixel shader)) of a shader program written in shading language. The programmable shader enables a programmable per-vertex process and per-pixel process, increases the degree of freedom with respect to the drawing process, and significantly improves the representation capability as compared with a fixed hardware drawing process.

The drawing section 220 performs a geometric process, a texture mapping process, a hidden surface removal process, an alpha-blending process, and the like when drawing the object.

The geometric process includes subjecting the object to a coordinate transformation process, a clipping process, a perspective projection transformation process, a light source calculation process, and the like. The drawing section 220 stores the object data (e.g., object's vertex position coordinates, texture coordinates, color data (luminance data), normal vector, or alpha-value) after the geometric process (after perspective transformation) in the storage section 270.

The texture mapping process includes a process for mapping a texture (texel value) stored in a texture storage section included in the storage section 270 onto the object. Specifically, the drawing section 220 reads a texture (surface properties such as color (RGB) and alpha-value) from the texture storage section included in the storage section 270 using the texture coordinates set (assigned) to each vertex of the object and the like, and maps the texture (two-dimensional image) onto the object. In this case, the drawing section 220 performs a pixel-texel link process, a bilinear interpolation process (texel interpolation process), and the like.

Note that the drawing section 220 may perform a process for mapping a given texture onto the object when drawing the object. In this case, it is possible to dynamically change the color distribution (texel pattern) of the texture to be mapped onto the object.

In this case, a texture that has a different color distribution (pixel pattern) may be dynamically generated, or a plurality of textures that differ in color distribution may be provided in advance, and dynamically selected. The color distribution of the texture may be changed on an object basis.

The drawing section 220 performs the hidden surface removal process using a Z-buffer method (depth comparison method or Z-test) that utilizes a Z-buffer (depth buffer) that stores the Z-value (depth information) of the drawing target pixel. More specifically, the drawing section 220 refers to the Z-value stored in the Z-buffer when drawing the drawing target pixel that corresponds to the primitive of the object, and compares the Z-value stored in the Z-buffer with the Z-value of the drawing pixel of the primitive. When the Z-value of the drawing pixel is a Z-value (e.g., small Z-value) that indicates a position on the front side when viewed from the virtual camera, the drawing section 220 draws the drawing target pixel, and updates the Z-value stored in the Z-buffer with a new Z value.

When the drawing section 220 performs the alpha-blending process, the drawing section 220 performs a translucent blending process (e.g., normal alpha-blending process, additive alpha-blending process, or subtractive alpha-blending process) based on the alpha-value (A-value). Note that the alpha-value is information that can be stored so as to be linked to each pixel (texel or dot), such as additional information other than the color information. The alpha-value may be used as mask information, translucency (equivalent to transparency or opacity), bump information, or the like.

The drawing section 220 may generate an image that is displayed within a display area that corresponds to the touch detection area. The image that is displayed within the display area may be an image that includes the object, for example. The lock-on processing unit processor 218 performs the lock-on process to determine (lock-on) an object that satisfies the lock-on condition, such as a condition for preferentially selecting an object, which is close to the player character, from among a plurality of objects appearing in the game space or a condition for preferentially selecting an object, which is close to the player character based on a central axis when the target is aligned, from among the plurality of objects.

The sound processor 230 performs sound processing based on the results of various processing performed by the processor 200, generates game sounds such as BGM, sound effect, or voice, and outputs the results to the sound output unit 292.

4. Method of this Embodiment

4.1. Summary

Next, an outline of a method (an information providing process of the player-related information based on the ranking of the game) according to this embodiment will be described with reference to FIGS. 4A to 4C.

FIGS. 4A to 4C are diagrams for explaining an outline of the information providing process of player-related information based on a ranking in the present embodiment.

The server 10, by working with the terminal device 20 operated by each player, sets one of the game space (i.e., a game field having a virtual three-dimensional space), for example, and has a configuration in which a match-up game, such as a shooting game or an action game, is executed by a plurality of player characters respectively controlled by each player within the game field.

The server 10 has a configuration in which a plurality of player characters moves in the game field formed on the game space to execute the game and provide information of the game to the terminal device 20.

In particular, the server 10 determines the ranking of each player on the basis of variable information such as the score or the match result obtained by each player at a given timing.

The server 10 is configured to provide other players with the important information for planning the strategy of the game in each player, such as the information of the equipment and the capabilities, the information of the location of the virtual space, information for losing the game including the remaining lives or energy, regarding the specific player who is the threat during the execution of the game or who has a low level which is highly likely to lose early.

Generally, in a match-up game or the like in which a plurality of players participates in the same game, when there is a difference in ability or level between the players, always the high-ability player or the high-level player wins, or plays the game by overwhelming strength. Therefore, the hearted battle cannot be realized and the entertainment of the game may be reduced.

For example, in a battle-royal game, it may be preferable from the game's strategy to lose the low-level player early in order because the last survivor is the winner.

Accordingly, in the present embodiment, important information of the important player for planning the various strategies in the various match-up games, such as the strategy of the high-ability player or the low-ability player, and the team strategy, is provided to the relevant player. It is possible to support each player in the match-up game.

As a result, it is possible to realize the heated match-up game by eliminating the ranking difference which exposes the difference in ability and the difference in level become obvious, and to improve the entertainment of the game by any player.

Specifically, during a game, the server 10 manages player-related information relating to each player stored in the player information storage 146 for each player and variable information corresponding to each player stored in the player information storage 146 and varying according to the progress of the game in the corresponding player.

The server 10 has a configuration for performing:
(A1) a ranking determination process for determining the ranking of each player based on variable information stored in a given timing;
(A2) a specific player specifying process for specifying a player having a given ranking of players as a specific player; and
(A3) an information providing process for providing the player-related information stored in the player information storage 146 in association with the player-related information corresponding to the specific player and identifying the specific player from other players to the terminal device 20 of the appropriate player.

For example, the server 10 has a configuration that:
(B1) determines the ranking of each player on the basis of variable information (points acquired according to the progress of the game) at each predetermined timing (FIG. 4A);
(B2) identifies a player (for example, a player having the highest ranking to the third ranking) having a given condition for the ranking of each player at the predetermined timing at the time point as a specific player (FIG. 4B);
(B3) generates display data to be recognized by the player on the game space displayed on the terminal device 20 of the relevant player together with the nick name of the specific player (FIG. 4C); and
(B4) transmits the generated display data to the terminal device 20 of the relevant player.

FIG. 4C shows an example of a game image of the terminal device 20 showing that a player character of an operation target of "A" and "Taro" is present in a game field of a game space displayed on the terminal device 20 of the player (a location of a dotted line), and a player character of an operation target of "AKI" is present in a right direction toward the drawing sheet with reference to the player character P of an operation target of the player to which information is provided.

With this arrangement, the server 10 can provide support to the player in developing various strategies in various match-up games, such as a player or a low player strategy for the game or a team strategy. Accordingly, the server 10 can realize he heated match-up game by eliminating the ability difference and the ranking difference, and as a result, the entertainment of the game can be improved in any player.

For example, by having such a configuration, the server 10 can:
(C1) handicap the high-ability player in the game by providing the player-related information thereof;
(C2) inform a player, who is advantageous for playing against each player or who is to be protected from attack by another player, by providing the player-related information of a low-level player;
(C3) plan a team strategy by providing, to the high-ability player, such as a team leader or a player who has a predetermined level or more in the team, information of a player who is likely to lose or player-related information of another team leader or a player who has a predetermined level or more in the team, when fighting between the teams; or
(C4) plan a strategy for fighting against to an opponent player(s) by providing player-related information of the player, who has a recovery item or requests to transfer a special capability, to a player who is likely to lose the game.

In this embodiment, it is preferable to apply the present embodiment to the match-up game (including an action role playing game) such as an FPS (First Person Shooting) game (First Person Shooter) in which the fighting is performed by the plurality of players with different abilities. Note that the server 10 or the like can be applied to the match-up game executed by the plurality of players (including a computer).

In this embodiment, another player character may be a character operated by another player, or an NPC (non-player character) controlled according to the game processing such as a program and not operated by the any player.

4.2. Management of the Player-Related Information Including the Variable Information Next, the management of player-related information including variable information will be described with reference to FIGS. 5A and 5B. FIGS. 5A and 5B are diagrams illustrating an example of player-related information including variable information stored in the player information storage 146.

4.2.1. Player-Related Information and Variable Information

The player-related information stored in the player information storage 146 for each player includes information of the player characters to be operated by each player.

For example, as shown in FIG. 5A, each player-related information includes:
(A1) one or more identification information, such as the player's nick name, player's ID, player character's ID, and player's login name, and further, team name and team's ID (hereinafter referred to as "team information") when the player belongs to one or more teams;
(A2) coordinate information (location information) indicating the coordinates of the location of the player character operated by the player in the game field,
(A3) variable information;
(A4) character information such as the player character's current position, characteristics and attributes;
(A5) information concerning the player character's equipment (items) and ability (information concerning the status of the player character changed due to the type of the player character's equipment and the status of the player character (hereinafter referred to as "camouflage status, etc.") (hereinafter referred to as "status information");

(A6) information of the current action of player characters during equipment preparation, resting (including while sleeping and eating) and battle (hereinafter referred to as "action information"), as well as information of the action history of the player characters such as the location in the battled game space, the equipment used during the battle, and the moving area (hereinafter referred to as "action history information"), (A7) information of the same team such as the number and location of player characters belonging to the same team in the player character (hereinafter referred to as "team information"), and (A8) information of the in-game money owned by the player character, the current billing amount and billing history (hereinafter referred to as "billing information").

For example, as shown in FIG. 5B, the variable information contained in the player-related information includes:

(A3-1) information of player's match result, which is a numerical score of the ability of the player or player character, to compare with other players, such as a winning rate and a kill-death ratio (the number of the killed players/(the number of the killed players+ the number of deaths of the own player)) in the game;

(A3-2) information of the points (including items such as coins), the score, the value of experience, and the in-game money, acquired during the match-up game (hereinafter collectively referred to as "point information");

(A3-3) information of the level of the player or player character that is set and changes according to the progress of the game (hereinafter referred to as "level information");

(A3-4) information of the status, such as the achievement rate and the number of achievements of the task, and the level and number of cleared stages in the game (hereinafter referred to as "status information"); and (A3-5) information for quantifying the item and ability owned by the player character (hereinafter referred to as "ability value information"); and (A3-6) information of a team-match result (hereinafter referred to as "team-match result information") which quantifies the ability of the team to which the player character belongs.

Each variable information is updated at a predetermined timing during the game.

For example, the predetermined timing includes:
(B1) the timing desired by each player;
(B2) the timing every predetermined period;
(B3) the predetermined time (including the real time and the in-game time) such as at midnight every day;
(B4) the timing when the map in the game space is changed;
(B5) the timing at which a predetermined event occurred or ended, including the timing at which the individual match or the team match is ended; and
(B6) the timing at which the player's ranking changes based on predetermined variable information.

Meanwhile, in order to determine the ranking of players participating in the game, the variable information storage 148 corresponds to the identification information of each player and stores the variable information of each player (specifically, one or more of the information from (B1) to (B6) described above).

4.2.2. Management of the Variable Information and the Player-Related Information The information manager 104, which works with game manager 103, in the game managing, updates the player-related information regarding each player and each player character stored in the player information storage 146 in accordance with the game progress.

The information managing unit 104 updates not only the player-related information of each player but also the variable information of the corresponding player, which is used for the ranking of the players, stored in the variable information storage 148.

4.3. Ranking Determination Process

Next, the ranking determination process according to this embodiment will be described.

The ranking determining processor 105 determines the ranking of each player participating in the game on the basis of the variable information at the timing when updating the variable information (in other word, at least one of the variable information of the player stored in the variable information storage 148) used to determine the ranking of the players.

Specifically, the ranking determining processor 105 compares the numerical values of the variable information of each player, and arranges the variable information in descending or ascending order to determine the ranking of each player.

The ranking determining processor 105 may determine the ranking of each player using two or more variable information. In this case, for each type of variable information, the ranking determining processor 105 converts the variable information into a value of a new scale, such as normalization, by using a predetermined calculation formula, and calculates the total value of the variable information by adding the value changed for each player.

The ranking determining processor 105 may compare the total values of each player to determine the ranking of each player by arranging variable information in descending or ascending order to determine the ranking of each player.

The player participating in the game may include a player which participates in the game at the timing when the ranking is determined and a player which has not participated already in the game by losing early or the like at the timing when the ranking is determined.

4.4. Specific Player Specifying Process

Next, the specific player specifying process according to the present embodiment will be described.

The specific player specifying processor 106 performs the specific player specifying process that determines a player (in other word, a specific player) who is provided with the player-related information for each player, based on the ranking of the players who participates in the game and who is determined by the ranking determining processor 105.

Specifically, the specific player specifying processor 106 specifies, as a specific player that satisfies a given condition:
(A1) a player having a predetermined ranking in the determined ranking of each player; or
(A2) a player having predetermined ranking that is determined based on the ranking of the player having the terminal device to which the player-related information is provided.

In particular, the specific player that satisfies a given condition includes:
(B1) in the case of (A1), a player that has the absolute ranking in the determined ranking, such as the top three players in the determined ranking;

(B2) in the case of (A2), a player that has the higher ranking (e.g., the 10th or higher ranking) or the lower ranking (e.g., 10th or lower ranking) than the player that is provided with the player-related information (hereinafter referred to as the "target player"); and (B3) in the case of (A2), a player that satisfies the predetermined condition according to the difference in ranking between the top ranking player and the target player (when the ranking difference from the top player to the target player is 5, the top to third ranking players are specified as the specific player, when the difference in ranking is 50 or more, only the top player is specified as the specific player, and the like).

In other word, as the specific player specifying processing, the specific player specifying processor 106 performs one of a plurality of processing. The plurality of the processing includes:

(C1) the specific player specific processing (hereinafter referred to as "specific player specific processing based on absolute ranking") for specifying the specific player in the case of (B1) based on the determined absolute ranking of each player participating in the game (hereinafter referred to as "specific player specific processing based on absolute ranking");

(C2) processing (hereinafter referred to as "specific player specific processing 1 based on the relative ranking") for specifying, as the specific player, the player in the case of (B2) that has a predetermined ranking difference based on the ranking of the player provided with the player-related information (hereinafter referred to as "provided target player") and the ranking of each players participating the game; and (C3) processing (hereinafter referred to as "specific player specific processing 2 based on the relative ranking"). for specifying, as the specific player, the player in the case of (B3) that satisfies the predetermined condition according to the ranking difference between the provided target player and a player having a predetermined ranking (for example, the top player)).

For example, the predetermined conditions in the case of (C3) include a condition whether or not there is a predetermined ranking difference, and whether or not there is a difference in variable information used for the predetermined ranking.

For example, the specific player specifying processor 106 specifies the top 5 players as the specific player in the specific player specific processing based on absolute ranking.

For example, the specific player specifying processor 106 specifies the players having the ranking of 40th to 49th as the specific player, or the players having the ranking of 40th or higher, when the relative ranking difference is 10 and the provided target player has the ranking of 50th in the specific player specifying process 1.

For example, in the specific player specifying process 2, the specific player specifying processor 106 specifies, as the specific player who satisfies the condition defined based on the provided target player who is a higher player:

(D1) all of the higher players of the ranking than the provided target player when the ranking difference is within 5;

(D2) the top five players of the ranking when the ranking difference is from 6 to 10;

(D3) the top three players of the ranking when the ranking difference is from 11 to 50; and (D4) only the top player of the ranking when the ranking difference is 51 or more.

As the specific player specific processing, the specific player specifying processor 106 may determine the number of winning opponent characters or the number of winning in the match-up game between individuals or teams instead of the ranking.

4.5. Information Providing Processing

Next, the information providing process of the present embodiment will be described with reference to FIGS. 6A to 10B. FIGS. 6A to 10B are diagrams for explaining an information providing process (providing the coordinate information, the status information, and the action information).

4.5.1. Principle of the Information Providing Processing

The information provider 110 generates image data for displaying, on the game screen of the terminal device 20 of the target player, the player-related information (including information of the specific player character of the operation target of the specific player) of the specific player determined for each player (the provided player), and the identification information corresponding to the specific player, and transmits the generated image data to the terminal device 20 of the appropriate player.

In particular, the information provider 110 generates the display data for displaying the player-related information of the specific player together with the identification information of the specific player in the display area of the game space, or the display area of an item, such as a radar or a map provided separately from the game space, in which the terminal device 20 of each player executes the game.

The information provider 110 uses information included in the player-related information, such as the player ID, the player character ID, the player's login name, the nick name in the game of the player, and the name of the player character, as the identification information.

The information provider 110 may generate the display data for displaying the player-related information of the specific player by incorporating into the game information generated to provide to each terminal device 20, or may generate the display data separately from the game information.

4.5.2. Display of the Coordinate Information of the Specific Player

The information provider 110 provides information including the coordinates in the game space of the location of the specified player character operated by the specified player, the coordinates related information related to the coordinates, or both (hereinafter, simply referred to as "coordinate information"), to the terminal device 20 of the appropriate player in association with the identification information of the specified player.

For example, the coordinate information of the present embodiment includes:

(A1) information of the area to which the coordinate of the location of the specified player character belongs among the areas where the game space is divided into a plurality of areas in advance;

(A2) information of navigation indicating a route from the location in the virtual space of the player character of the target player (hereinafter, referred to as the "own player character") to the coordinates of the specific player character, and a direction of the coordinates; and (A3) information of the orientation of the player character and the direction of the virtual camera to image the virtual space.

Figure 6B:
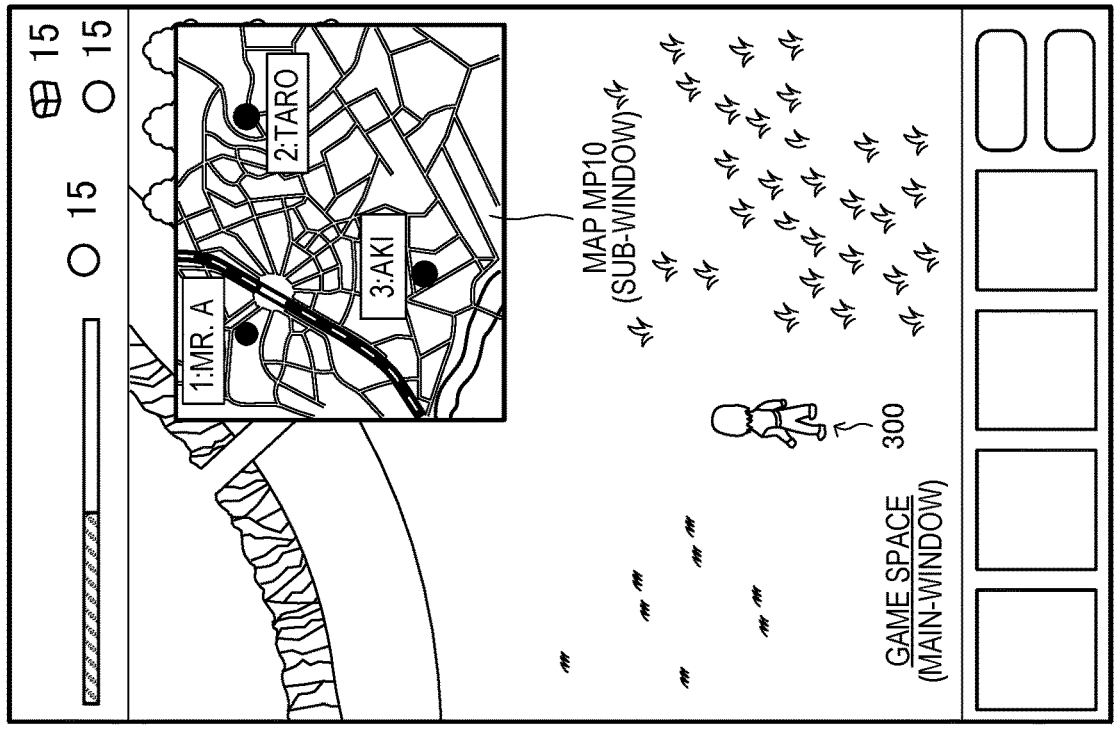
FIGS. 6A and 6B are diagrams illustrating an information providing process (for the coordinate information) performed by the server of the one embodiment.
Figure 6A:
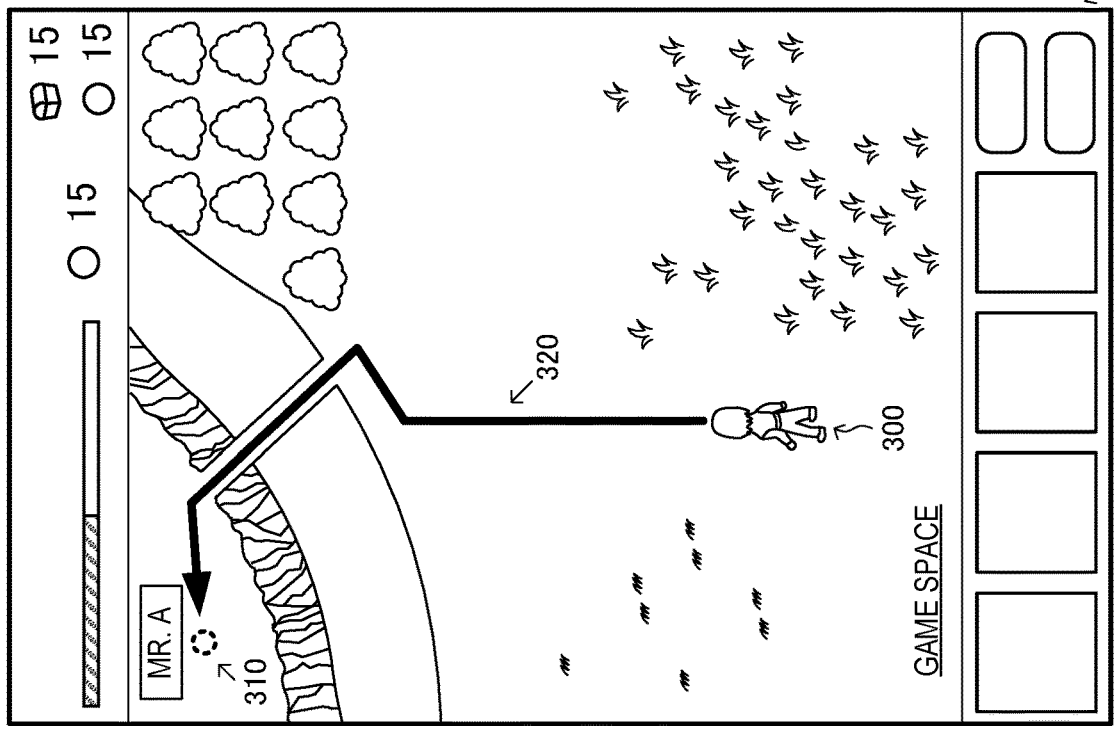

As shown in FIG. 6(A), the information provider 110 generates the display data for displaying the coordinate information on the main window displaying the game space in which the player character moves, and provides the data to the appropriate terminal device 20.

Further, as shown in FIG. 6(B), the information provider 110 generates the display data for displaying the coordinate information on sub window displaying the map of the whole game space or the radar used to easily watch the game space, other than the main window displaying the game space in which the player character moves, and provides the data to the appropriate terminal device 20.

FIGS. 6A and 6B are examples in which coordinate information is displayed on the terminal device 20 of the target player that operates the own player character.

In particular, FIG. 6(A) shows an example of the main window on which the route 320 from the coordinates of location of the own player character 300 to the location of the coordinates of the specific player character 310 of the specific player (Mr. A) having the top ranking, is displayed, when the coordinates of location of the specific player character 310 is displayed on the main window displaying the game space.

Further, FIG. 6(B) shows an example of the sub window displaying the map MP10 in which the coordinates of the locations of the specific player characters of the top three ranking players are displayed, other than the main window displaying the game space.

4.5.3 Display of the Status Information of the Specific Layer Character 1 (Basic Process)

The information provider 110 provides the status information representing the status of the specified player character that is the operation target of the specified player, as player-related information, to the terminal device 20 of the appropriate player in association with the identification information of the specified player.

In particular, the status information of this embodiment includes:

(B1) information of the equipment installed on the player character (including the offensive equipment, the attack protection equipment, the attack and defense support equipment, and camouflage items to camouflage in the background), capability of the equipment (including conditions for use of remaining ammunition and the like), information whether or not the equipment was used when other player character is lost, level of the equipment, skill of the player character regarding the equipment (handling skill), the expiration date of the equipment;

(B2) information regarding the capability of the player character (the offensive power, the defensive power, the agility, the types of capability such as magic and superiority);

(B3) information of the position of the player character (orientation and positions of parts of the player character's body) and the state of the player character (wet state, a state of food shortage and the like);

(B4) information of the condition for losing the player character, such as the power value of the player character; and (B5) information of the status, such as the level of the player and the player character, or the achievement rate of the task.

Figure 7B:
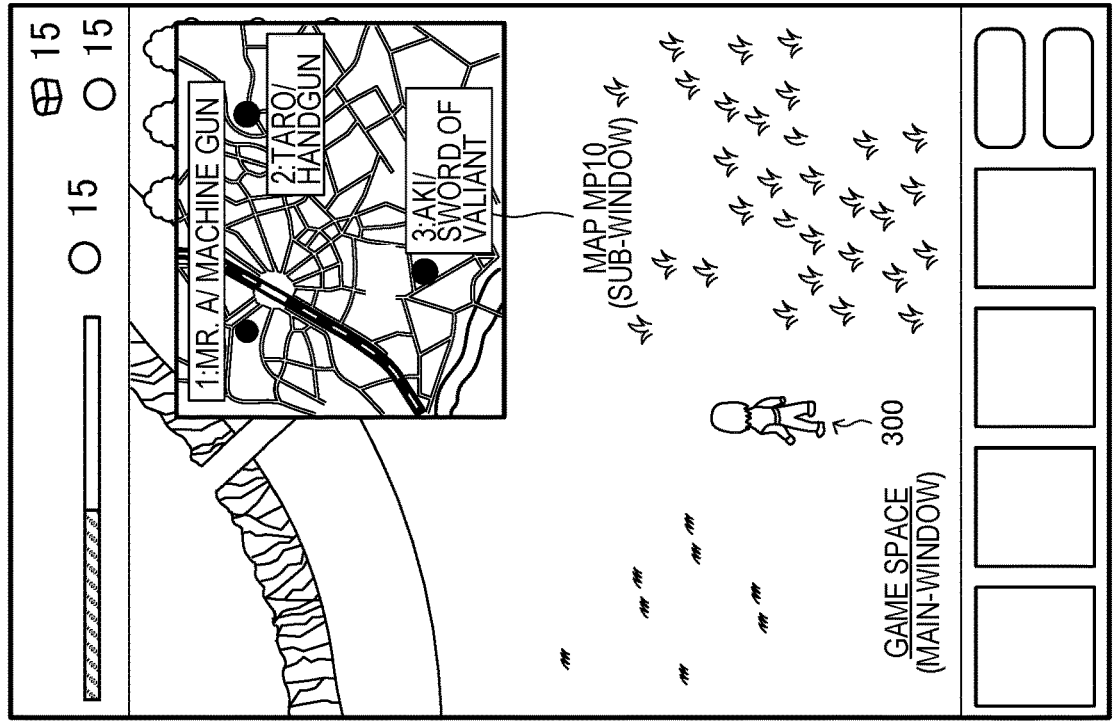
FIGS. 7A and 7B are diagrams illustrating an information providing process (for the status information 1) performed by the server of the one embodiment.
Figure 7A:
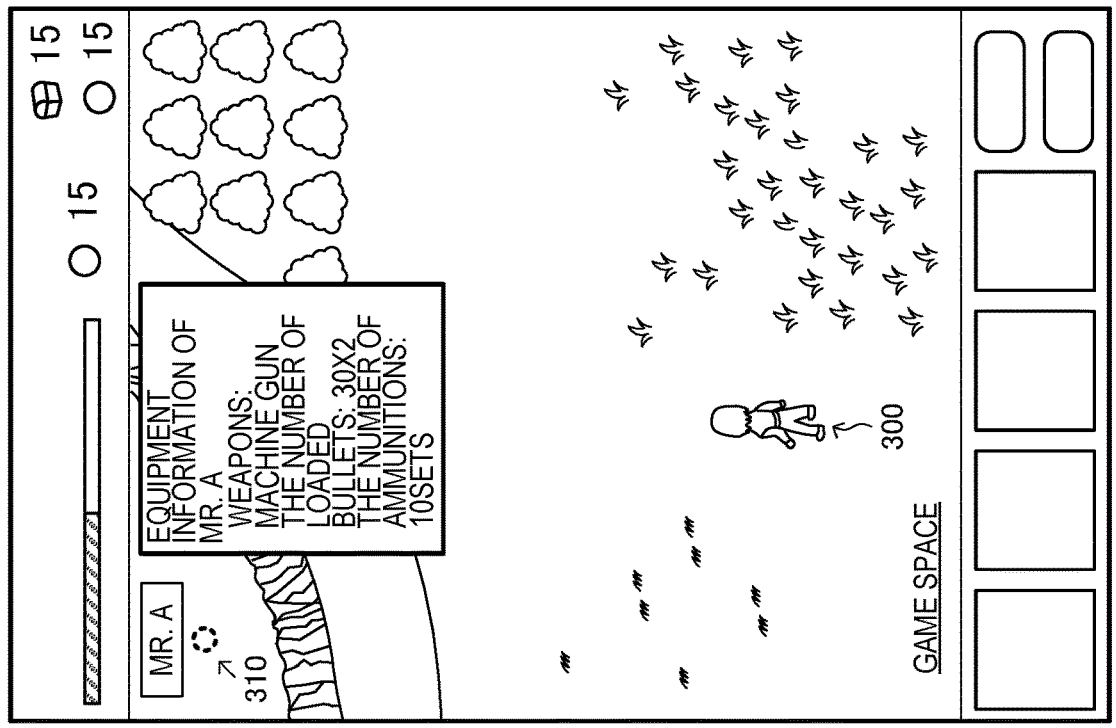

As shown in FIG. 7(A), the information provider 110 generates the display data for displaying the information of the equipment of the specific player with the coordinate information thereof on the main window displaying the game space in which the player character moves, and provides the data to the appropriate terminal device 20.

Further, as shown in FIG. 7(B), the information provider 110 generates the display data for displaying the status information indicating the power value of the player character (the remaining pawer value until the specific player lost the game) with the coordinate information thereof on sub window displaying the map of the whole game space or the radar used to easily watch the game space, other than the main window displaying the game space in which the player character moves, and provides the data to the appropriate terminal device 20.

FIGS. 7A and 7B are examples in which the status information is displayed on the terminal device 20 of the target player which operates the own player character.

In particular, FIG. 7(A) shows an example of the main window on which the information of the equipment (equipment information) of the specific player, who is the top-ranking player (Mr. A) with the coordinate information of the location thereof, is displayed.

FIG. 7(B) shows an example of the sub window displaying the map MP10 in which the coordinates of the locations of the specific player characters of the top three ranking players and the equipment information are displayed, other than the main window displaying the game space.

4.5.4. Display of Status Information of Specific Player Character 2 (Invalidated Status)

The information provider 110 may provide information for displaying the specific player character in the non-recognizable status or in the camouflage status by invalidating the non-recognizable status, in which the specific player character operated by the target player cannot be recognized by the other players, or in the camouflage status in which the specific player character camouflages into a given object arranged in the game space, to the terminal device 20 of the appropriate player in association with the identification information of the specific player.

For example, various objects, such as an object of a moving body, a construction, natural formation including a tree, a grass and a bush, and geography including a prominence, a cave, a hole and a hollow, can be used. Further, the specific player character operated by the player can be set in the non-recognizable status by the other players.

For example, during the execution of the game based on the operation of each player, the information provider 110 sets the appearance or the shape of the player character operated by the player to the same color or the same colored design as a grass, a mountainous area, a forest area, an urban area, a sea, a river, a lake, a construction including a building, or the moving body, such as a car or a train, in order to set the player character so as to be integrated into the surrounding landscape of the game space in which the player character exists, based on the operation of the player during the game.

Figure 8B:
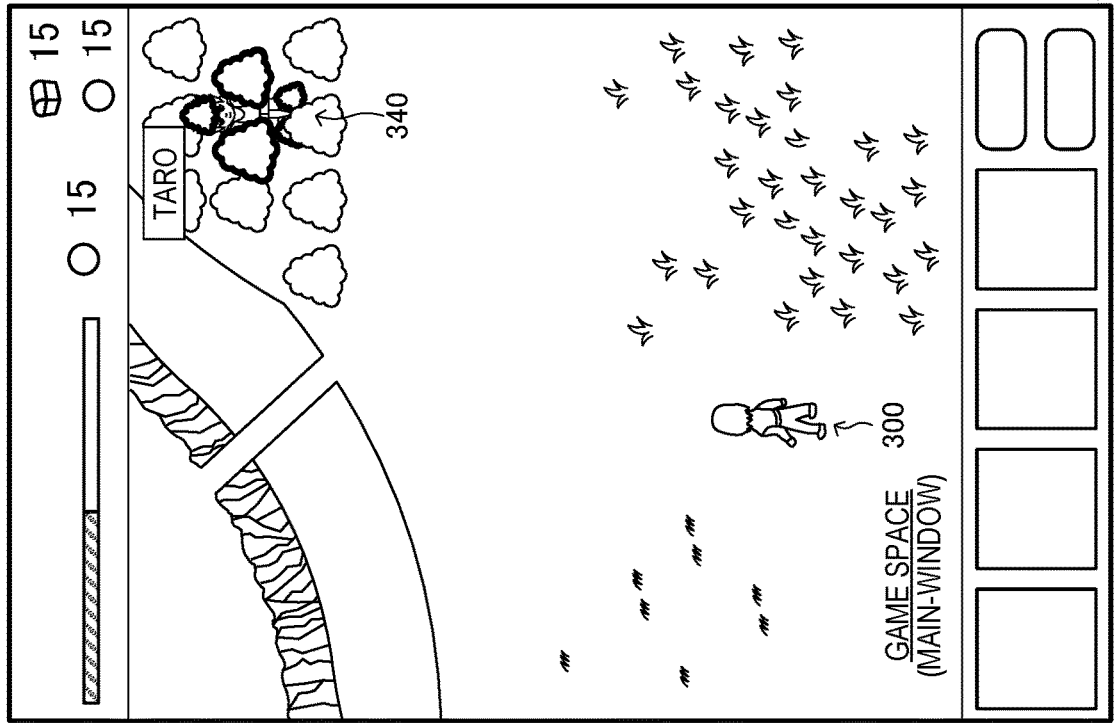
FIGS. 8A and 8B are diagrams illustrating an information providing process (for the status information 2) performed by the server of the one embodiment.
Figure 8A:
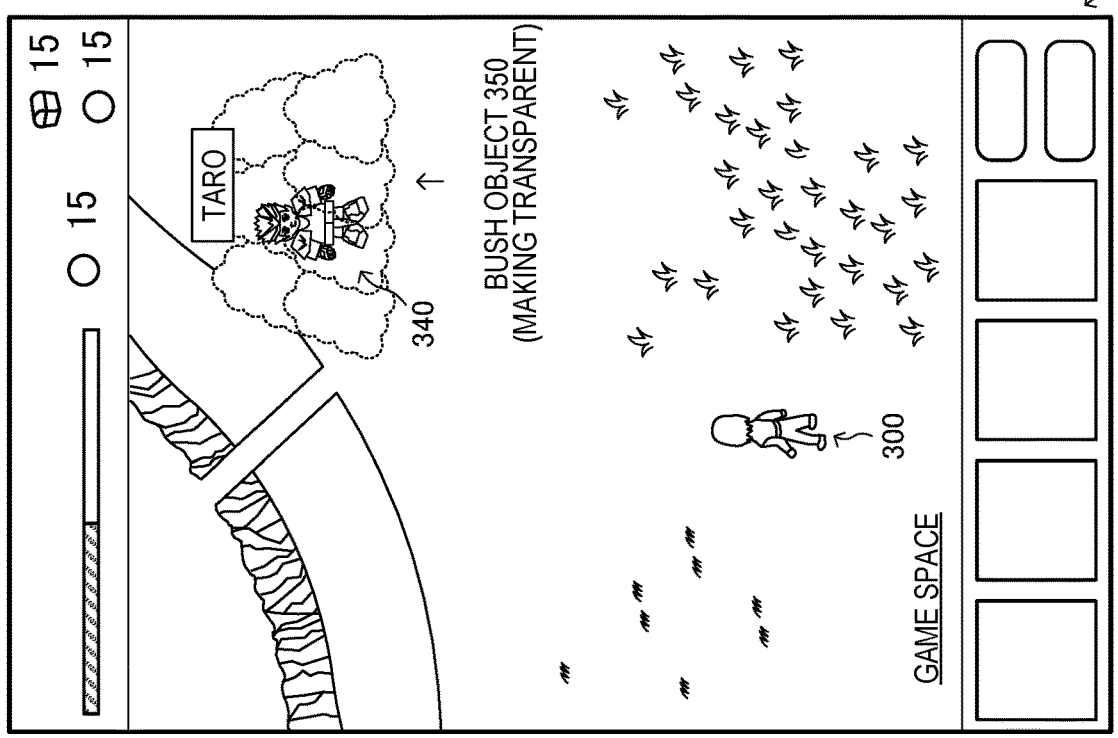

For example, when the specific player character is not recognized by the other players, the information provider 110 generates display data in which the object (bush object) 350 between the hiding specific player character (the player character of the player [Taro]) 340 and the own player character 300 is changed to a transparent object, and provides the generated display data to the appropriate terminal device 20, so that an image shown in FIG. 8A is displayed on the appropriate terminal device 20.

For example, when the specific player character is camouflaged, the information provider 110 generates display data that emphasizes the appearance or the shape of the camouflaged specific player character (player character of the player [Taro]) 340, and provides the generated display data to the relevant terminal device 20, so that the image shown in FIG. 8B is displayed on the relevant terminal device 20.

Instead of the above-described display data, the information provider 110 may generate display data for displaying arrows or text in the vicinity of the specific player character (player character of the player [Taro]) 340 in the non-recognizable status or in the camouflaged status, so that the image shown in FIG. 9 is displayed on the appropriate terminal device 20, for example. In particular, FIG. 9 shows the main window on which arrow object 360 is formed in the vicinity of the specific player character (player character of a player [Taro]) 340 hidden in the bush object 350.

4.5.5. Displaying Action Information of the Specific Player Character

The information provider 110 may provide the action information of the specific player character that is operated by the specific player to the terminal device 20 of the appropriate player in association with the identification information of the specific player as player-related information.

In particular, the action information of this embodiment includes:

(C1) information indicating that the equipment used for the attacks, such as the reloading of the firearms, is being prepared, (C2) information indicating the period until the preparations of the above equipment are completed, and (C3) information indicating that it is impossible to avoid the attacks from other players, such as while resting (including while eating or sleeping), climbing walls, or fighting.

Figure 10B:
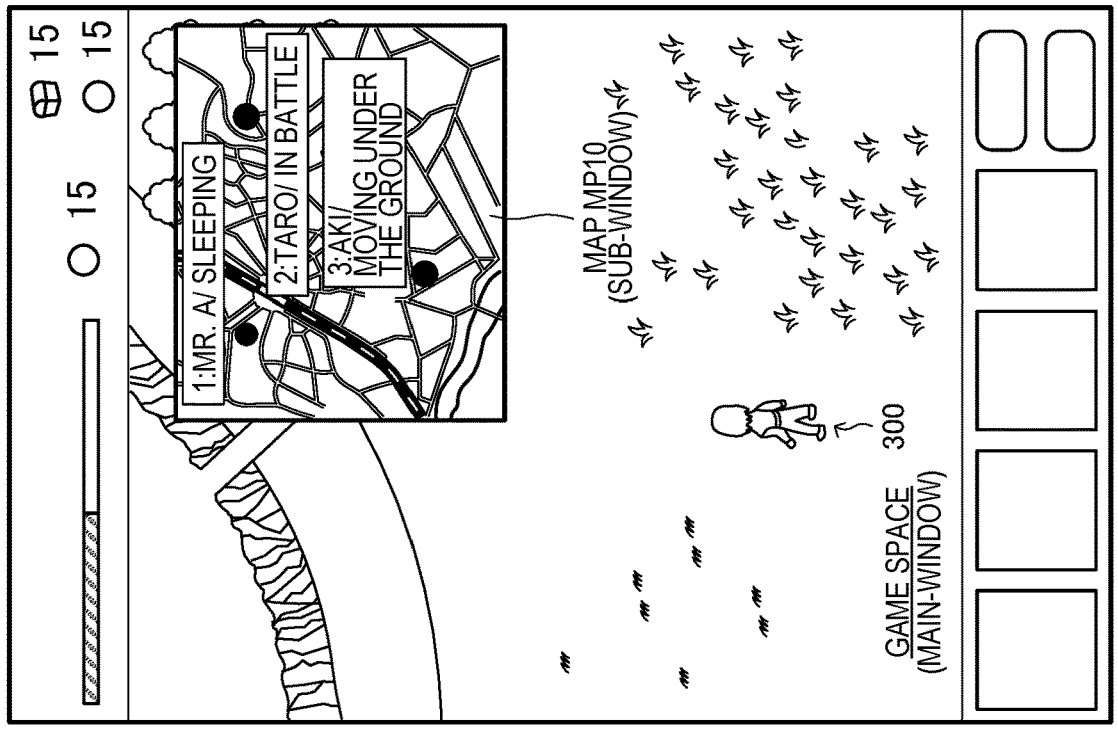
FIGS. 10A and 10B are diagrams illustrating an information providing process (for the action information) performed by the server of the one embodiment.
Figure 10A:
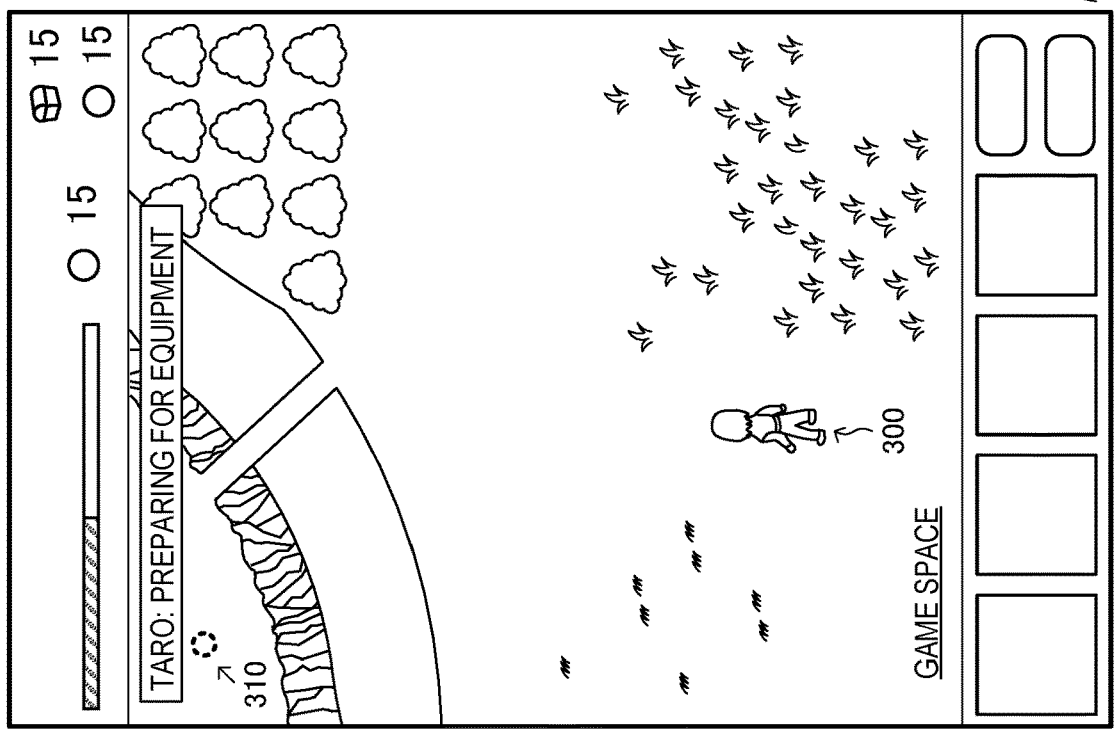

As shown in FIG. 10A, the information provider 110 generates the display data for displaying the action information indicating that the equipment of the specific player is being prepared with the coordinate information thereof on the main window displaying the game space in which the player character moves, and provides the data to the appropriate terminal device 20.

Further, as shown in FIG. 10B, the information provider 110 generates the display data for displaying the action information of "Mr. A/SLEEPING" indicating that the specific player character of the specific player, Mr. A, is sleeping, "TARO/IN BATTLE" indicating that the specific player character of the specific player, Taro is in the battle with another player, and "Aki/moving under the ground" indicating that the specific player character of the specific player, Aki is moving under the ground, with the coordinate information thereof on sub window displaying the map MP10 of the whole game space or the radar used to easily watch the game space, other than the main window displaying the game space in which the player character moves, and provides the data to the appropriate terminal device 20.

4.5.6. Displaying Action History Information of the Specific Player Character

The information provider 110 may provide the action history information concerning the action history of the specific player character operated by the specific player as player-related information, to the terminal device 20 of the relevant player in association with the identification information of the specific player. For example, the action history related information of this embodiment includes:

(D1) the location or area in the virtual space where the specific player character appears a predetermined number of times or more;

(D2) information relating to the match, such as the moving route, the type and number of attacks that the specific player character executed, or the type and number of attacks that the specific player character received from other player characters, during the predetermined period before the given timing or the last predetermined number of the matches in the past;

(D3) information relating to a reason for winning or losing the specific player character during the predetermined period before the given timing or the last predetermined number of the matches in the past;

(D4) information relating to a strategy for the specific player character to win based on the action history of the specific player character such as the specific player character has to set the long preparation period during the match-up game in order to have equipment that has a long set period of preparation; and (D5) action prediction information of the player character corresponding to the order that the action history and the current status.

In particular, the information provider 110 analyzes and acquires the information (D3) to (D5) by using the information (D1) and (D2).

For example, when the information of (D1) and (D2) of the specific player character includes information of the specific player character that the number of attacks was small in the past two matches and the specific player character was lost, the information provider 110 provides the information regarding the cause of the failure and, as information of the strategy, the information that the equipment in which the number of attacks is high in the competition against the specific player character is essential.

For example, when the information of (D1) and (D2) of the specific player character includes information that the specific player character moves from point A to point B four times a week in the morning time zone, the information provider 110 provides action prediction information that the specific player character may appear between point A and point B in the next morning.

The information provider 110 generates, together with the coordinate information, display data for displaying the action history information described above on the main game image for displaying in the game space in which the player character moves, and provides the information to the corresponding terminal device 20.

In addition to the main game image for displaying in the game space, the information provider 110 generates display data for displaying the above-described action history information along with the coordinate information of a map of the game space or a sub game image for displaying a radar for observing the game space and provides the map to the corresponding terminal device 20.

4.6. Modification

Next, a modification of the information providing processing according to the present embodiment will be described.

4.6.1. Modification 1: Changing in the Content of the Player-Related Information According to the Ranking The information provider 110 may change the content of the player-related information provided to the terminal device of the appropriate player, such as the accuracy of the displayed player-related information, the amount of the displayed information, or the detail of the displayed information in accordance with the ranking of the specific player.

When changing the accuracy of information, the information provider 110 changes the accuracy of location error of the specific player in the game space in accordance with the ranking of the specific player. For example, the information provider 110 increases the accuracy of the location in the specific player character of the high-ranking player (for example, ±1 m), and decreases the accuracy of location in the specific player character of a low-ranking player (for example, ±10 m).

When changing the degree of detail, the information provider 110 changes the degree of detail of the equipment information according to the ranking of the specific player. For example, when the specific player has the high ranking, the information provider 110 provides the equipment information for displaying the more detailed category of the equipment which the specific player character has. Further, when the specific player has the low ranking, the information provider 110 provides the equipment information for displaying the outline of the category of the equipment which the specific player character has.

Specifically, it is assumed that equipment information is divided into three categories: major categories (attack items and defense items); middle categories (guns and swords in attack items); and small categories (machine guns and pistols in gun items).

In this case, the information provider 110 provides information of the small category (the possession of which is a machine gun) with regard to the equipment owned by the specific player character of the high-ranking specific player, and provides information of the large category (the possession of which is an attack item) with regard to the equipment owned by the specific player character of the low-ranking specific player.

Further, for example, when changing the information amount, the information provider 110 changes the amount of the displayed equipment information according to the ranking of the specific player. For example, when the specific player has the high ranking, the information provider 110 provides a lot of the equipment information of the specific player character. Further, when the specific player has the low ranking, the information provider 110 provides a low amount of the equipment information of the specific player character.

Specifically, the information provider 110 provides the equipment information of the high-ranking specific player, including the information that the machine gun is owned by the specific player character and the information of the number of loadings, the number of ammunition sets and the accuracy rate of the machine gun, and the equipment information of the low-ranking specific player, including only the information that the machine gun is owned by the specific player character.

When the own player character of the target player battles with the specified player, and the target player wins the specified player, the game manager 103 may provide the target player or the own player character of the target player benefits (points or items such as the experience value) more than when the specific player wins the target player.

4.6.2. Modification 2: Display Frequency of the Player-Related Information According to the Ranking The information providing unit information provider 110 may change the display frequency of the player-related information provided to the terminal device 20 of the appropriate player according to the ranking of the specific player.

Specifically, the information provider 110 generates the display data:

(A1) for displaying the player-related information of the higher (or lower) specific player at the shorter intervals than at regular intervals when the player-related information of each player is displayed at regular intervals;

(A2) for displaying the player-related information of the specific player which has the higher ranking (or lower ranking) with higher probability when displaying the location of the player character using weapons as player-related information, and when determining whether or not the location is displayed based on the probability; or (A3) for displaying the player-related information of the specific player which has the higher ranking (or lower ranking) for a longer time than the specific player which has the lower ranking (or higher ranking) when displaying the player-related information of each player in the display period which is set.

For example, in the case of (A1), the information provider 110 displays the coordinate information in the specific player character of the specific player who has higher ranking at intervals of 5 minutes. On the other hand, the information provider 110 displays the coordinate information in the specific player character of the specific player who has lower ranking at intervals of 30 minutes.

For example, in the case of (A2), the information provider 110 displays the player-related information of the specific player who has the higher ranking at the display probability of 95% when using an attack item (firing a gun). On the other hand, the information provider 110 displays the player-related information of the specific player who has the lower ranking at the display probability of 50% when using an attack item (firing a gun).

For example, in the case of (A3), the information provider 110 displays the coordinate information of the specific player character of the specific player who has the higher ranking until one hour has elapsed from the start of display. On the other hand, the information provider 110 displays the coordinate information of the specific player character of the specific player who has the lower ranking for 5 minutes until 5 minutes has elapsed from the start of display.

In the case where the display frequency of the player-related information is changed, the information provider 110 may determine whether or not the specific player character (i.e., the presence or absence of a location display) is displayed on the radar as the item possessed by each player according to the ranking of each player. Further, the information provider 110 may determine the display frequency of the specific player character (the timing when the display frequency is a predetermined timing (interval)) regarding the location of the specific player character displayed on the radar.

For example, the information provider 110 always generates the display data for displaying the coordinate information of the location of the specific player character of the higher-ranking player that is more than a predetermined ranking from the ranking of the target player (for example, the specific player having the top five players of the ranking when the target player is 60th or lower ranking). Further, the information provider 110 generates the display data for displaying the coordinate information of the location of the specific player character of the specific player higher in rank than the target player or closer to the target player (for example, the specific player is 60th and the ranking of the target player is in the 50s) at predetermined intervals.

Instead of the above or in addition to the above, the information provider 110 may generate image data whose display frequency is changed in accordance with the one or more other conditions of the game, such as the variable information including the power value of the specific player character, the frequency of movement of the specific player, whether or not specific player character has the item or uses the item, or the status of the specific player character (including the use of a magic item).

For example, when the remaining amount of the power value (variable information) of the specific player character is large (for example, 50% or more), the information provider 110 generates the image data for controlling the displayed interval longer (for example, 49% or less) than when the remaining amount of the power value is small.

For example, when the frequency of movement of the specific player character is high (for example, when the ratio of stop period and the movement period of the specific player is high during the most recent one-day, the ratio is 50% or more), the information provider 110 generates the image data for controlling the displayed interval longer than when the frequency of movement of the specific player character is low (for example, when the ratio of stop period and the movement period of the specific player is high during the most recent one-day, the ratio is 49% or less).

The information provider 110 calculates the movement frequency based on the action history information of the specific player character of the appropriate specific player.

4.6.3. Modification 3: Player Related Information According to Ranking and Distance The information provider 110 may change the display contents of the player-related information of the specific player in accordance with the ranking of the specific player and the distance from the location of the player character operated by the target player to the location of the specific player character of the specific player in the game space.

Specifically, the higher ranking (the lower ranking) the specific player has, the information provider 110 may generate display data for displaying, on the corresponding terminal device 20, the player-related information of the specific player of the specific player character that exists farther from the own player character of the target player.

For example, when the specific player is determined by the absolute ranking as the specific player having a given condition, the information provider 110 generates display data for displaying, on the terminal device 20 of the target player:

(B1) the player-related information of the top specific player of the ranking, in the case where the specific player character of the top specific player exists within a radius of 50 km from the location of the target player in the game space;

(B2) the player-related information of the second specific player of the ranking, in the case where the specific player character of the second specific player exists within a radius of 30 km from the location of the target player in the game space; and (B3) the player-related information of the 10th specific player of the ranking in the case where the specific player character of the 10th specific player exists within a radius of 5 km from the location of the target player in the game space, 4.6.4. Modification 4: Special Display (Auto Aim Display) of Player-Related Information in Game Space When the specific player character of the specific player, of which the player-related information is displayed, is captured in a view from the player character of the target player (in a game space viewed from the virtual camera in the case where the virtual camera is disposed at the viewpoint of the player character), the information provider 110 may generate the image data for displaying player-related information by the special display (auto aim display) on a predetermined area of the main window on which the game space is imaged.

Specifically, the information provider 110 generates image data for:

(C1) a display in which the display size of the specific player character is changed at the location where the specified player character is present on the main window on which the game space is imaged (for example, five times the normal size), or (C2) a new window formed at the location where the specific player character is present on the main window and an enlarged display (telephoto display) of the specific player character or a part thereof having a predetermined size within the window.

The information provider 110 may change the accuracy regarding the player-related information of the displayed player character, such as changing the display size of the specific player character in the above-described case, according to the ranking of the target player and the specific player.

The game manager 103, which works with lock-on process unit (not shown) of the corresponding terminal device 20, may execute the lock-on process to select the appropriate specific player character (specifically, to select the target attacked from the player character of the target player) while automatically aiming at the location where the specific player character is disposed in the game space and displaying the image (hereinafter referred to as the "aiming image") of the gun-sight (tickle).

5. Processing Flow in the Embodiment

Next, the information providing process including the ranking determination process and the specific player process that provides player-related information executed by the server 10 to the appropriate terminal device 20 will be described with reference to FIG. 11.

Figure 11:
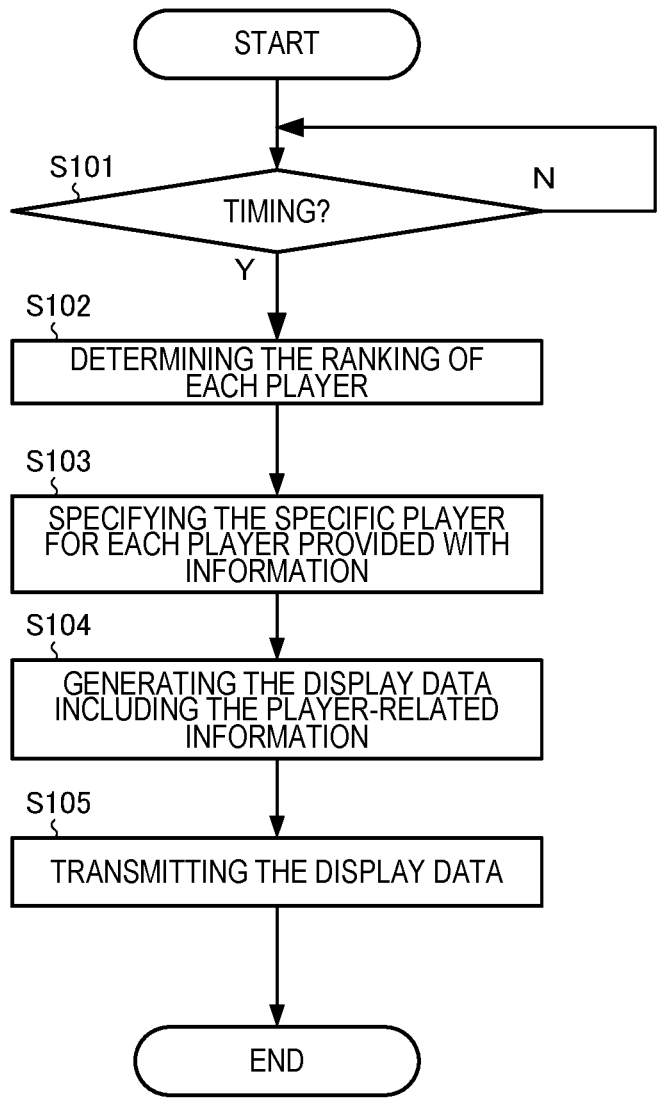
FIG. 11 is a flowchart illustrating an information providing process including a ranking determination process and a specific player process performed by the server of the one embodiment.

FIG. 11 is a flowchart illustrating the information providing process including the ranking determination process and the specific player process performed by the server 10.

In this process, the player information required for each player is already recorded in the player information storage 146 and the variable information storage 148, and is appropriately updated.

First, the ranking determining processor 105 detects the ranking determining timing of the predetermined player (Step S101), and then, determines the ranking of each player based on the variable information of each player stored in the variable information storage 148 (Step S102).

Next, the specific player section 106 determines a player having a predetermined absolute ranking, a player having a predetermined ranking determined by the ranking of the target player, or a player having a predetermined ranking determined by the ranking difference between the ranking of the target player and the top ranking, as the specific player, for each of the target players, based on the each players of the rankings that is decided (Step S103).

Next, the information provider 110 generates the display data for displaying the player-related information, which is stored in the player information storage 146 in accordance with the specified player, and the identification information, which identifies the specified player from other players, in association, on the terminal device 20 of the appropriate target player (Step S104).

Finally, the information provider 110 transmits the generated display data to the terminal device 20 of the target player (Step S105), and the present processing flow terminates.

The ranking determining processor 105 determines the ranking of each player at a predetermined timing. The specific player specifying processor 106 may specify the specific player in for each target player every predetermined timing or when the predetermined timing is detected. The information provider 110 performs the information providing process based on the specific player and target player.

6. Other

The present invention is not limited to those described in the above-described embodiments, but various modifications and variations can be made. For example, words cited as broadly or synonymously in the description or drawings may be replaced by broadly or synonymously in the description or drawings.

Although the match-up game is used in the above described embodiment, it may also be used in other games such as RPG or simulation games.

Each game may be provided to the terminal device 20 by one server 10, or a server system may be constructed by a plurality of servers 10, and each game may be provided to the terminal device.

Further, in the above-described embodiment, the game provided by the server 10 is executed by the terminal device 20. However, except for the operation input, each function of the processor 200 of the terminal device 20 and the execution of the game program are executed by the server 10, and the terminal device 20 may execute the operation input and the image display by streaming in ranking to realize the above-described game.

In addition, the invention may be implemented by a single game device provided with the function of the server 10, in other word, a device that operates independently without depending on other devices such as the server (stand-alone). In this case, the invention may include a plurality of input terminal devices.

A plurality of game terminal devices can be connected by wires or wireless, and one game device functions as the server 10, which can be realized by a plurality of game devices.

In the above-described embodiment, the game system of the present invention is applied to the server 10 executed in conjunction with the terminal device 20 through the network. However, the game system can be applied to the tablet-type information terminal device, the personal computer, or the game device installed in the amusement park.

The present invention includes an arrangement substantially identical to the one described in the embodiments (for example, an arrangement with identical functions, methods, and results, or an arrangement with identical purposes and effects). The invention also includes a non-essential portion of the configuration described in the embodiments. The present invention also includes configurations having the same effect as or capable of achieving the same purpose as the configurations described in the embodiments. The present invention also includes a structure described in the embodiments and a structure in which known techniques are added.

Although the embodiment of the present invention has been described in detail as described above, it will be readily apparent to those skilled in the art that many variations are possible without departing materially from the new matter and effect of the present invention. Accordingly, all such modifications are intended to be within the scope of the present invention.

What is claimed is:

1. A game system for executing a match-up game for a plurality of players and providing information of the match-up game to a terminal device, the game system comprising:
   at least one memory;
   at least one processor operatively coupled to the at least one memory, the at least one processor being programmed to:
   provide a plurality of player characters within a game field that is formed in a virtual space, the plurality of player characters each corresponding to a respective player of the plurality of players,
   manage player-related information corresponding to each player during the match-up game for each player, the player-related information being stored in the at least one memory;
   manage variable information associated with each player, the variable information of each player being varied according to a progress of the match-up game for each respective player;
   determine a ranking of each player based on the variable information at a given timing during play of the match-up game, so as to identify a highly-ranked player, and a low-ranked player that is ranked lower that the highly-ranked player; and
   provide: (a) the player-related information corresponding to the highly-ranked player, and (b) identification information that identifies the highly-ranked player in the match-up game, to the terminal device during the match-up game, the terminal device being associated with the low-ranked player,
   wherein the player-related information includes location information of a specific player character which is operated by the highly-ranked player in the virtual space in which the match-up game is played.

2. The game system according to claim 1, wherein the at least one processor is programmed to further provide, as additional information of the player-related information, status information representing a status of the specific player character which is operated by the highly-ranked player, to the terminal device of the low-ranked player, along with the identification information of the highly-ranked player.

3. The game system according to claim 2, wherein the at least one processor is programmed to provide, as the status information, information that increases a visibility of the specific player character which is operated by the highly-ranked player when the highly-ranked player is at least partially obscured from view in the game field.

4. The game system according to claim 1, wherein the at least one processor is programmed to provide, as the player-related information, action information of the specific player character which is operated by the highly-ranked player, to the terminal device of the low-ranked player, along with the identification information of the highly-ranked player.

5. The game system according to claim 1, wherein the at least one processor is programmed to provide, as the player-related information, action history-related information indicating action history of the specific player character which is operated by the highly-ranked player during the game, to the terminal device of the low-ranked player, along with the identification information of the highly-ranked player.

6. The game system according to claim 1, wherein
the at least one processor is programmed to change a content of the player-related information which is provided to the terminal device of the low-ranked player, according to the ranking of the highly-ranked player.

7. The game system according to claim 1, wherein
the at least one processor is programmed to change a display frequency of the player-related information which is provided to the terminal device of the low-ranked player according to the ranking of the highly-ranked player.

8. The game system according to claim 1, wherein
the at least one processor is programmed to change a display content of the player-related information of the highly-ranked player for displaying based on (i) the ranking of the highly-ranked player and (ii) a distance in the virtual space from a player character operated by the low-ranked player to a player character highly-ranked player.

9. A method of executing a match-up game for a plurality of players and providing information of the match-up game to a terminal device, the method comprising:
providing a plurality of player characters within a game field that is formed in a virtual space, the plurality of player characters each corresponding to a respective player of the plurality of players;
managing player-related information corresponding to each player during the match-up game for each player, the player-related information being stored in a storage for each player during the match-up game;
managing variable information stored in the storage associated with each player, the variable information of each player being varied according to a progress of the match-up game for each respective player;
determining a ranking of each player based on the stored variable information at a given timing during play of the match-up game, so as to identify a highly-ranked player, and a low-ranked player that is ranked lower that the highly-ranked player; and
providing (a) the player-related information corresponding to the highly-ranked player, and (b) identification information that identifies the highly-ranked player in the match-up game, to the terminal device during the match-up game, the terminal device being associated with the low-ranked player,
wherein the player-related information includes location information of a specific player character which is operated by the highly-ranked player in the virtual space in which the match-up game is played.

10. A game system for executing a match-up game for a plurality of players, the game system comprising:
at least one memory; and
at least one processor operatively coupled to the at least one memory, the at least one processor being programmed to:
provide a plurality of player characters within a game field that is formed in a virtual space, the plurality of player characters each corresponding to a respective player of the plurality of players,
manage player-related information corresponding to each player during the match-up game for each player, the player-related information being stored in the at least one memory, and manage variable information associated with each player, the variable information of each player being varied according to a progress of the match-up game for each respective player;
determine a ranking of each player based on the variable information at a given timing during play of the match-up game, so as to identify a highly-ranked player, and a low-ranked player that is ranked lower that the highly-ranked player; and
a display controller that displays (a) the player-related information corresponding to the highly-ranked player, and (b) identification information that identifies the highly-ranked player, on a display associated with the low-ranked player,
wherein the player-related information includes location information of a specific player character which is operated by the highly-ranked player in the virtual space in which the match-up game is played.

11. A method of executing a match-up game for a plurality of players, the method comprising:
providing a plurality of player characters within a game field that is formed in a virtual space, the plurality of player characters each corresponding to a respective player of the plurality of players;
managing player-related information corresponding to each player during the match-up game for each player, the player-related information being stored in a storage for each player during the match-up game, and managing variable information stored in the storage and associated with each player, the variable information being varied according to a progress of the match-up game for each respective player;
determining a ranking of each player based on the stored variable information at a given timing during play of the match-up game, so as to identify a highly-ranked player, and a low-ranked player that is ranked lower that the highly-ranked player; and
displaying (a) the player-related information corresponding to the highly-ranked player and (b) identification information that identifies the highly-ranked player, on a display associated with the low-ranked player,
wherein the player-related information includes location information of a specific player character which is operated by the highly-ranked player in the virtual space in which the match-up game is played.

* * * * *